(12) United States Patent
Weng et al.

(10) Patent No.: US 9,025,476 B2
(45) Date of Patent: May 5, 2015

(54) METHOD AND SYSTEM FOR RANDOM ACCESS INTERFERENCE MITIGATION IN HETEROGENEOUS CELLULAR NETWORKS

(75) Inventors: Jianfeng Weng, Kanata (CA); Shiguang Guo, Kanata (CA); Shiwei Gao, Nepean (CA); Mo-Han Fong, Ottawa (CA); Youn Hyoung Heo, Hwasung (KR); Andrew Mark Earnshaw, Kanata (CA)

(73) Assignee: BlackBerry Limited, Waterloo, CA (US)

( * ) Notice: Subject to any disclaimer, the term of this patent is extended or adjusted under 35 U.S.C. 154(b) by 183 days.

(21) Appl. No.: 13/458,591

(22) Filed: Apr. 27, 2012

(65) Prior Publication Data

US 2013/0039195 A1  Feb. 14, 2013

Related U.S. Application Data

(60) Provisional application No. 61/521,929, filed on Aug. 10, 2011.

(51) Int. Cl.
| | |
|---|---|
| *H04L 12/26* | (2006.01) |
| *H04W 48/20* | (2009.01) |
| H04W 74/08 | (2009.01) |
| H04W 84/04 | (2009.01) |

(52) U.S. Cl.
CPC .............. *H04W 48/20* (2013.01); *H04W 74/08* (2013.01); *H04W 84/045* (2013.01); *Y02B 60/50* (2013.01)

(58) Field of Classification Search
CPC ..................................................... H04W 48/20
USPC ................................................. 370/252, 328
See application file for complete search history.

(56) References Cited

U.S. PATENT DOCUMENTS

2007/0268846 A1* 11/2007 Proctor et al. ................ 370/279
2010/0069064 A1    3/2010 Hannu et al.
(Continued)

FOREIGN PATENT DOCUMENTS

| WO | 2008051037 | | 5/2008 |
|---|---|---|---|
| WO | 2010019483 | A1 | 2/2010 |

(Continued)

OTHER PUBLICATIONS

3GPP, TS 36.211, 3rd Generation Partnership Project; Technical Specification Group Radio Access Network; Evolved Universal Terrestrial Radio Access (E-UTRA); Physical Channels and Modulation (Release 8) (Sep. 2007).

(Continued)

*Primary Examiner* — Wei Zhao
(74) *Attorney, Agent, or Firm* — Moffat & Co.

(57) ABSTRACT

Methods and systems at a user equipment, low power access node and first access node operating in a wireless network having a plurality of access nodes comprising a first access node and at least one low power access node having lower transmit power than the first access node, wherein the user equipment receives stronger downlink signals from the first access node than from the at least one low power access node, the method at the user equipment determining, by the user equipment, whether a low power access node is better for uplink data transmission than the first access node; and if the low power access node is better for uplink data transmission, sending from the user equipment to the low power access node, a random access preamble directed to the first access node.

28 Claims, 16 Drawing Sheets

(56) References Cited

U.S. PATENT DOCUMENTS

| | | | |
|---|---|---|---|
| 2010/0173637 A1* | 7/2010 | Damnjanovic et al. | 455/447 |
| 2010/0322145 A1 | 12/2010 | Yu et al. | |
| 2010/0325506 A1 | 12/2010 | Cai et al. | |
| 2011/0223900 A1 | 9/2011 | Yu et al. | |
| 2011/0244863 A1* | 10/2011 | Matsuo et al. | 455/436 |
| 2011/0249619 A1 | 10/2011 | Yu et al. | |
| 2012/0127880 A1 | 5/2012 | Yu et al. | |
| 2012/0258724 A1* | 10/2012 | Kim et al. | 455/452.2 |

FOREIGN PATENT DOCUMENTS

| | | |
|---|---|---|
| WO | 2010070854 | 6/2010 |
| WO | 2010143851 | 12/2010 |

OTHER PUBLICATIONS

3GPP, TS 36.216, 3rd Generation Partnership Project;; Technical Specification Group Radio Access Network; Evolved Universal Terrestrial Radio Access (E-UTRA); Physical layer for relaying operation (Release 10) (Sep. 2010).

3GPP TSG-RAN WG1 #61bis, R1-104256, Jun. 28-Jul. 2, 2010, Dresden, Germany, Title: "eICIC Solutions Details", Qualcomm.

3GPP TSG RAN WG1 #61bis Meeting, R1-103824, Dresden, Germany, Jun. 28-Jul. 2, 2010, Title: "Aspects of Pico Node Range Extension", Nokia Siemens Networks, Nokia.

3GPP TSG RAN WG1 Meeting #61bis , R1-103574, Dresden, Germany, Jun. 28-Jul. 2, 2010, Title: "Inter-cell Interference Mitigation between PRACH and PUCCH/PUSCH in Heterogeneous Networks", MediaTek. ftp://ftp.3gpp.org/tsg_ran/WG1_RL1/TSGR1_61b/Docs/.

Qualcomm, "LTE Advanced: Heterogeneous Networks", Jan. 2011.

Qualcomm Europe, "Signaling for spatial coordination in DL CoMP", 3GPP TSG-RAN WG1 #56, R1-090867, Feb. 2009.

A. Agrawal, "Heterogeneous Networks: A new paradigm for increasing cellular capacity", Jan. 2009, http://netseminar.stanford.edu/seminars/01_29_09.pdf.

3GPP TS36.423, 3rd Generation Partnership Project; Technical Specification Group Radio Access Network; "Evolved Universal Terrestrial Radio Access Network (E-UTRAN); X2 Application Protocol (X2AP)", Sec.8.3.1, Sep. 2009, http://www.3gpp.org/ftp/Specs/html-info/36423.htm.

3GPP TS 36.300, V10.2.0 (Dec. 2010), EUTRA/ EUTRAN; Overall Description; Stage 2 (Release 10).

A. Damnjanovic, "Interference management for LTE heterogeneous networks", http://isl.stanford.edu/colloquium/presentationSlidesFall2010/AleksDamnjanovic.pdf.

G. Berardinelli, B. E. Priyanto, T. B. Sorensen, and P. Mogensen, "Improving SC-FDMA performance by Turbo equalization in UTRA LTE uplink", http://vbn.aau.dk/files/19119881/improvingSCFDMA.pdf.

S. W. Peters, A. Y. Panah, K. T. Truong, and R. W. Heath Jr., "Relay architectures for 3GPP LTE-Advanced", http://downloads.hindawi.com/journals/wcn/2009/618787.pdf.

T. Beniero, S. Redana, J. Hamalainen, and B. Raaf, "Effect of relaying on coverage on 3GPP LTE-Advanced", http://202.194.20.8/proc/VTC09Spring/Data/09-07-03.Pdf.

3GPP TSG-RAN WG2 Meeting #72bis, R2-110423 "Title: Introduction of ABS definition and 2 subsets for pattern 3";Jan. 17-21, 2011 CR 36.300.

J. Weng et al, U.S. Appl. No. 13/162,447, filed Jun. 16, 2011.

TS 36.133, "3rd Generation Partnership Project; Technical Specification Group Radio Access Network; Evolved Universal Terrestrial Radio Access (E-UTRA); Requirements for support of radio resource management (Release 8)", Sep. 2009.

PCT application No. PCT/CA2011/000897, J. Weng, S. Guo, C. Bontu and M. Earnshaw, "Method and System for Uplink Interference Management in Heterogeneous Cellular Networks".

TS 36.212, "3rd Generation Partnership Project; Technical Specification Group Radio Access Network; Evolved Universal Terrestrial Radio Access (E-UTRA); Multiplexing and channel coding (Release 8)", http://www.3gpp.org/ftp/Specs/html-info/36212.htm.

PCT application No. PCT/CA2012/000706, International Search Report and Written Opinion of the Interantional Searching Authority, mailed Oct. 1, 2012.

Japanese Office Action on Japanese Application No. 2013-548709, issued May 1, 2014.

Korean Intellectual Property Office, Office Action, Application No. 10-2013-7024168, Feb. 9, 2015.

\* cited by examiner

METHOD AND SYSTEM FOR RANDOM ACCESS INTERFERENCE MITIGATION IN HETEROGENEOUS CELLULAR NETWORKS

CLAIM OF PRIORITY

This application claims priority under 35 U.S.C. §119(e) to U.S. Provisional Patent Application Ser. No. 61/521,929, filed on Aug. 10, 2011, the entire contents of which are hereby incorporated by reference.

FIELD OF THE DISCLOSURE

The present disclosure relates to heterogeneous networks and in particular to uplink random access interference at a lower power node in a heterogeneous network.

BACKGROUND

Homogeneous networks are networks which are typically deployed using a macro-centric planned process. A homogeneous network is a network of base stations in a planned layout, in which all base stations have similar transmit powers, antenna patterns and similar backhaul connectivity to a core network. The locations of base stations are typically chosen during the network planning phase and base station settings are configured to maximize coverage and control interference between multiple base stations. As traffic demand grows and the radio environment changes, the network relies on cell splitting or additional carriers to increase capacity and overcome link budget limitations to maintain a uniform user experience.

Heterogeneous networks involve utilizing a diverse set of base stations deployed to improve capacity. A heterogeneous network may contain a macro base station, several overlaid pico stations, femto base stations, remote radio heads, relay base stations or a combination of these components. A base station can be understood as a node B, an evolved node B (eNB), a network node, or an access node. The overlaid base stations may operate on the same radio frequency or on different radio frequencies. The macro base station typically transmits at a high power level while the other base stations transmit at relatively lower power levels. The connections between the base stations may be through fibre or cable. In some examples, such as femto base stations, the base stations may be connected to the core network through the Internet. Macro base stations and relay base stations are connected to each other through a wireless backhaul link in some embodiments. In this case, the macro base station is called the donor base station and has gateway functionality. Such a base station may also be referred to herein as an access node.

The use of multiple base stations with different power levels in the same cell may lead to interference between the base stations. For example, as the macro base station typically transmits at a high power level while other base stations transmit at relatively lower power levels, a user equipment (UE) that may see higher signal to interference noise ratio (SINR) or received signal power from the macro base station may actually have a lower path loss to a lower power base station. Based on the received signal powers, the UE may select the macro base station as its target base station. During a random access to the macro base station, the UE following a random access channel procedure (RACH) may use a physical random access channel (PRACH) with a high power that may cause random access interference to the lower power base station on uplink resources for other UEs serviced by the lower power base station.

BRIEF DESCRIPTION OF THE DRAWINGS

The present disclosure will be better understood with reference to the drawings in which.

DETAILED DESCRIPTION

Figure 1:
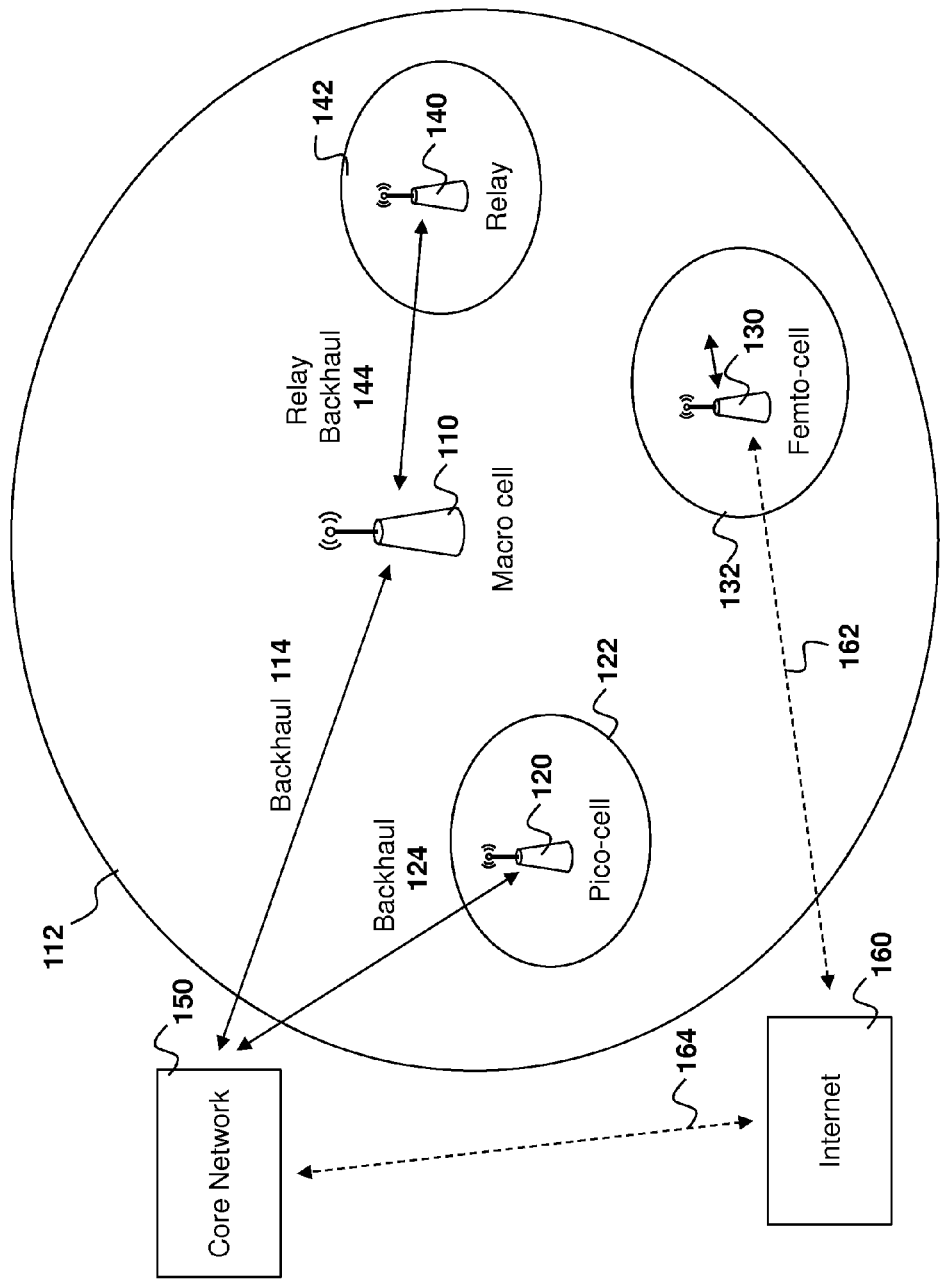
FIG. 1 is an architectural diagram of a conventional heterogeneous network.

The present disclosure provides a method at a user equipment operating in a wireless network having a plurality of access nodes comprising a first access node and at least one low power access node having lower transmit power than the first access node, wherein the user equipment receives stronger downlink signals from the first access node than from the at least one low power access node, the method comprising: determining, by the user equipment, whether a low power access node is better for uplink data transmission than the first access node; and if the low power access node is better for uplink data transmission, sending from the user equipment to the low power access node, a random access preamble directed to the first access node.

The present disclosure further provides a user equipment operating in a wireless network having a plurality of access nodes comprising a first access node and at least one low power access node having lower transmit power than the first access node, wherein the user equipment receives stronger downlink signals from the first access node than from the at least one low power access node, the user equipment comprising: a processor; and a communications subsystem, wherein the processor and communications subsystem cooperate to: determine whether a low power access node is better for uplink data transmission than the first access node; and if the low power access node is better for uplink data transmission, send to the low power access node, a random access preamble directed to the first access node.

The present disclosure further provides a method at a low power access node operating in a wireless network having a plurality of access nodes comprising a first access node and at least one low power access node having lower transmit power than the first access node, the method comprising: determining, at the low power access node, the presence of a first random access preamble configured for the first network node; and forwarding a report of the first random access preamble to the first network node.

The present disclosure further provides a low power access node operating in a wireless network having a plurality of access nodes comprising a first access node and at least one low power access node having lower transmit power than the first access node, the low power access node comprising: a processor; and a communications subsystem, wherein the processor and communications subsystem cooperate to: determine, at the low power access node, the presence of a first random access preamble configured for the first network node; and forward a report of the first random access preamble to the first network node.

The present disclosure further provides a method at a first access node operating in a wireless network having a plurality of access nodes comprising the first access node and at least one low power access node having lower transmit power than the first access node, the method comprising: detecting the presence of a random access preamble of a first set of random access preambles over a first set of random access opportunities; receiving at least a physical random access channel ('PRACH') detection report from at least one low power node containing at least one of a random access preamble identifier indicating a second preamble of a second set of preambles detected over the second preamble opportunities, a preamble resource identifier indicating the time-frequency resource over which the preamble was detected, a detected second time of arrival, a second time offset, and a second uplink power adjustment; and sending a random access response for each of at least one of the first preamble and the second preamble detected by the first access node or received in the detection report from the at least one low power access node.

The present disclosure further provides a first access node operating in a wireless network having a plurality of access nodes comprising the first access node and at least one low power access node having lower transmit power than the first access node, the first access node comprising: a processor; and a communications subsystem, wherein the processor and communications subsystem cooperate to: detect the presence of a random access preamble of a first set of random access preambles over a first set of random access opportunities; receive at least a physical random access channel ('PRACH') detection report from at least one low power node containing at least one of a random access preamble identifier indicating a second preamble of a second set of preambles detected over the second preamble opportunities, a preamble resource identifier indicating the time-frequency resource over which the preamble was detected, a detected second time of arrival, a second time offset, and a second uplink power adjustment; and send a random access response for each of at least one of the first preamble and the second preamble detected by the first access node or received in the detection report from the at least one low power access node.

Reference is now made to FIG. 1, which shows an exemplary heterogeneous network deployment model. In the embodiment of FIG. 1, a macro cell 110 has a cell coverage area shown by circle 112. To improve data throughput at the cell edges and to improve connectivity, various cells with a lower power than the macro cell may be deployed within the area 112. These include pico cell 120 which has a coverage area shown by circle 122, femto cell 130 which has a coverage area shown by circle 132 and relay 140 which has a coverage area shown by circle 142.

Macro cell 110 is connected through a backhaul link 114 to core network 150. Similarly, pico cell 120 may also be connected through backhaul link 124 to core network 150.

Relay 140 may have a relay backhaul 144, which in one embodiment may be wireless, to macro cell 110.

Femto cell 130 connects to core network 150 through the Internet 160, shown through links 162 and 164 in the embodiment of FIG. 1.

As used herein, a lower power node could be any of the pico cell, femto cell, remote radio head, relay or other lower power nodes operating within the heterogeneous network. A lower power node will typically operate with lower power and therefore have lower coverage area than a macro cell. For example, in one embodiment the macro cell may transmit in the range of 40 dBm to 49 dBm while a typical lower power node (LPN) transmit power may be in the range of 30 dBm to 37 dBm. The lower power nodes and the macro node could be individually or collectively referred to as access nodes.

In the $3^{rd}$ Generation Partnership Project (3GPP) Long Term Evolution (LTE) standards, which is also known as Evolved Universal Terrestrial Radio Access (E-UTRA) Release-8, uplink random access channel (RACH) procedures are used during initial access, handover (HO), reestablishment of uplink (UL) synchronization and if a scheduling request procedure fails or cannot be performed, or if a resource for a scheduling request is not configured.

During an initial access and uplink resynchronization, a UE may randomly select one preamble sequence from a set of preconfigured random access preamble sequences and then send a preamble using the selected preamble sequence over the uplink resource allocated to the physical random access channel (PRACH). For the purpose of illustration, a preamble using a sequence from a set of preamble sequences is also referred to as a preamble from the set of preambles. A time-frequency portion of uplink resources allocated for UEs in a cell to send PRACH preambles is also referred to as a PRACH opportunity window.

During a handover or uplink resynchronization triggered by a physical downlink control channel (PDCCH) order, a UE may be assigned a specific, dedicated, random access preamble sequence to send over the resources allocated to PRACH.

A random access preamble may include a cyclic prefix (CP) of length $T_{CP}$ and a PRACH sequence of length $T_{SEQ}$. Different CP lengths and sequence lengths may be needed to support different cell sizes.

Reference is now made to Table 1 below, which shows five different preamble formats, PRACH format 0 to PRACH format 4. These are defined in 3GPP E-UTRA Release 8. In the example of Table 1, $T_S$ is equal to $1/(30.72 \times 10^6)$ seconds.

TABLE 1

PRACH Formats

| Preamble format | $T_{CP}$ | $T_{SEQ}$ |
| --- | --- | --- |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4* | $448 \cdot T_s$ | $4096 \cdot T_s$ |

From Table 1, preamble formats 0-3 are used for both frequency division duplex (FDD) and time division duplex (TDD) systems, while format 4 is used for TDD only.

In PRACH resource allocation, a guard time (GT) of length $T_{GT}$ may be used to account for the round trip propagation delay between the UE and the eNB since, at the time of the PRACH transmission, uplink synchronization may not yet be established and PRACH preambles are transmitted synchronized with the downlink sub-frame boundary as received at the UE. Thus, there is no UE-specific uplink timing advance typically for a PRACH transmission. The above results in the PRACH preamble being received at the eNB with a round trip propagation delay between the UE and the eNB with respect of the eNB transmit timing.

Figure 2:
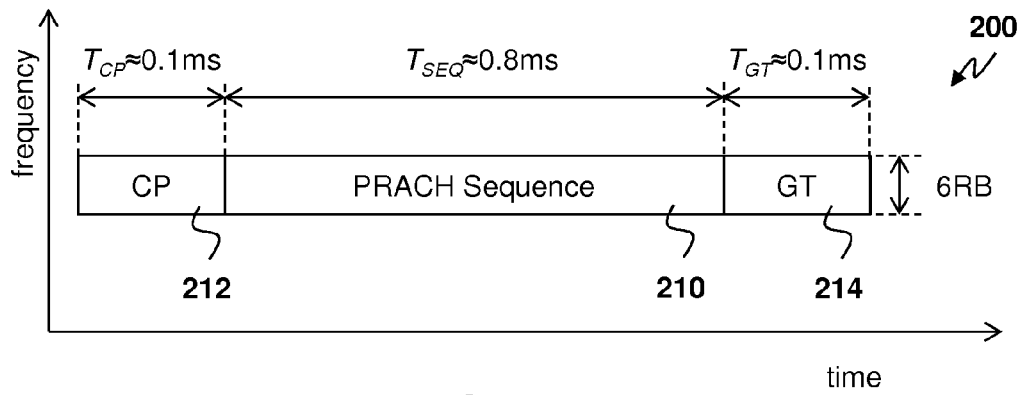
FIG. 2 is a block diagram showing a PRACH preamble structure according to one embodiment.

Reference is now made to FIG. 2, which shows the preamble structure 200 of a PRACH format 0 according to one embodiment, where the sequence time ($T_{SEQ}$) 210 is equal to 0.8 milliseconds, the cyclic prefix (CP) 212 has a time of 103.13 microseconds and the guard time 214 has a time of 96.87 microseconds.

PRACH format 0 may be used in cells with a cell radius of up to 14 kilometers in some embodiments. Cells with a size larger than 14 kilometers may be supported by other PRACH formats. The PRACH preamble occupies a frequency bandwidth of approximately 6 resource blocks, wherein the frequency bandwidth of one resource block (RB) is equal to 180 kHz, with 12 sub-carriers with 15 kHz sub-carrier spacing.

In one embodiment, the PRACH preamble sequence is generated from a Zadoff-Chu sequence which has a low peak to average power ratio (PAPR) property. The low peak to average power ratio is useful for uplink transmissions as it may result in a low cost signal amplification at UEs.

A time continuous signal representation s(t) of a random access preamble is defined by:

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+\frac{1}{2}))\Delta f_{RA}(t-T_{CP})} \quad (1)$$

Where $0 \leq t < T_{SEQ} + T_{CP}$, $\beta_{PRACH}$ is an amplitude scaling factor in order to conform to the transmit power $P_{PRACH}$, $x_{u,v}(n)$ is the uth root Zadoff-Chu (ZC) sequence with cyclic shift v, $k_0 = n_{PRB}^{RA} N_{SC}^{RB} - N_{RB}^{UL} N_{SC}^{RB}/2$. $k_0 = n_{PRB}^{RA} N_{SC}^{RB} - N_{RB}^{UL} N_{SC}^{RB}/2$. Note that $x_{u,v}(n)$ is also referred to as a random access preamble sequence. The preamble sequence used in a random access may be selected from a set of preamble sequences. The number of the preamble sequences in the set is 64 in 3GPP LTE. The location in the frequency domain is controlled by the parameter $n_{PRB}^{RA} \cdot N_{SC}^{RB}$ is the number of sub-carriers per RB and $N_{RB}^{UL}$ is the number of RBs on the UL. The factor $K = \Delta f / \Delta f_{RA}$ accounts for the difference in subcarrier spacing between the random access preamble and other uplink data transmissions. The variable $\Delta f_{RA}$ represents the subcarrier spacing for the random access preamble, and the variable $\varphi$ represents a fixed offset determining the frequency-domain location of the random access preamble within the physical resource blocks. $N_{ZC}$ is the length of the ZC sequence.

Figure 3:
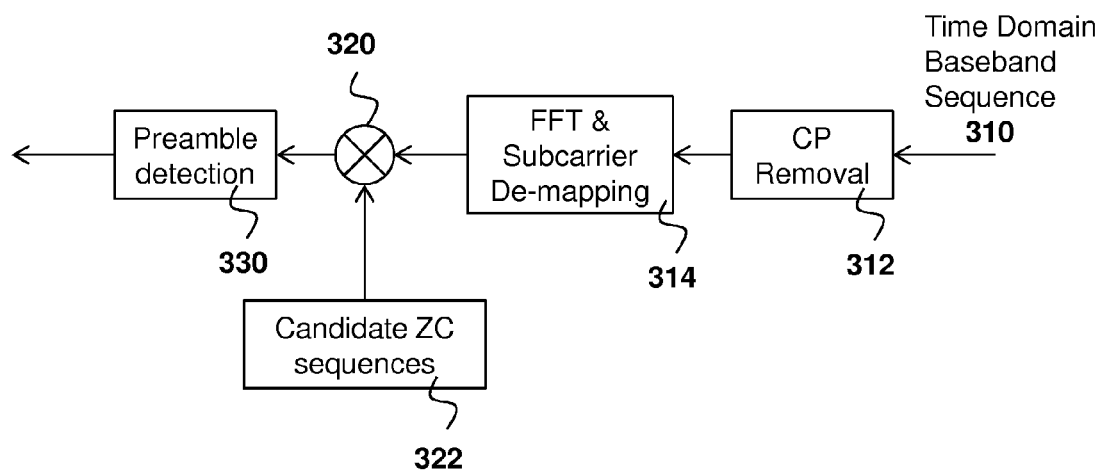
FIG. 3 is a block diagram showing an exemplary PRACH detection at an eNB according to one embodiment.

Reference is now made to FIG. 3. In FIG. 3, a system for detection of the PRACH at an evolved node B (eNB) according to one embodiment is shown. In particular, within a given PRACH opportunity window, i.e., within a portion of time-frequency resources allocated by the eNB for UEs in the cell to send PRACH preambles, the signal in FIG. 3 is received as a time domain baseband sequence 310 and provided to a cyclic prefix removal block 312. The starting time for the cyclic prefix removal is the starting time of the PRACH opportunity window. After the cyclic prefix removal, the signal is passed to a Fast Fourier Transform (FFT) and sub-carrier de-mapping block 314.

The transformed and de-mapped signal is then provided to a correlation block 320, which takes candidate Zadoff-Chu sequences from block 322 and provides for the detection. Once the correlation occurs with the candidate ZC sequence, preamble detection then can occur at block 330. The correlation at block 320 occurs in the frequency domain.

RACH Procedure

Figure 4:
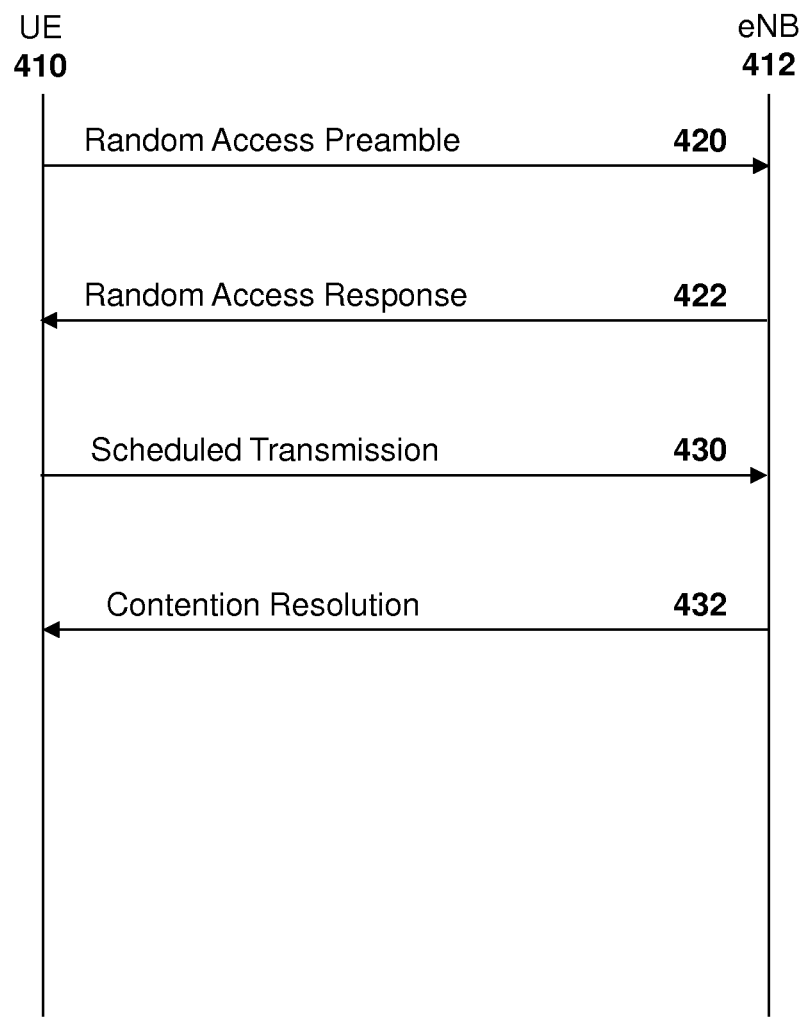
FIG. 4 is a signaling diagram showing a conventional RACH procedure.

Reference is now made to FIG. 4, which shows a procedure for contention based random access procedure. In particular, in FIG. 4 a UE 410 communicates with an eNB 412. At the outset, UE 410 sends a random access preamble, shown by arrow 420 to eNB 412. The random access preamble is based on system information received from the eNB in broadcast messages, PDCCH order or handover command and the UE transmits a preamble using the configured preamble format and on the configured PRACH time and frequency resource. The preamble may use a preamble sequence that may be selected from a set of preamble sequences configured in the cell or may be specified by the eNB in a handover command or PDCCH order.

If a random access attempt is detected, such as the receipt of the random access preamble 420, the eNB 412 transmits a downlink grant in a Physical Downlink Control Channel (PDCCH) with the cyclic redundancy check (CRC) scrambled with a random access-radio network temporary identifier (RA-RNTI) and transmits the corresponding random access response (RAR) message, as shown by arrow 422, on a physical downlink shared channel (PDSCH). The RA-RNTI indicates the time-frequency resource over which the preamble was detected. In this document, for the purpose of illustration, a random access response is also referred to as a RACH response to indicate a response to a PRACH preamble. The RA-RNTI is determined by the time-frequency resource over which the PRACH is received and is also known to the UE 410. The RAR contains information such as the detected random access preamble identifier (RAPID), i.e. the preamble index within the set of preamble sequences configured in the cell, a timing advance command for uplink transmissions from the UE 410, a temporary UE identity (i.e. temporary cell-RNTI (C-RNTI)), and an initial uplink resource grant including an uplink power adjustment.

When receiving the RAR message 422 from the eNB 412 with a matching RA-RNTI and preamble identifier (RAPID), the UE 410 assumes the PRACH has been received by the eNB 212 and thus transmits an uplink message, shown by arrow 430. The uplink message may include a UE-specific common control channel (CCCH) message on the scheduled physical uplink shared channel (PUSCH) after applying the timing advance and uplink power adjustments. The cyclic redundancy check (CRC) code of the message is scrambled by the temporary C-RNTI.

The eNB then performs contention resolution, as shown by arrow 432, when multiple UEs use the same preamble and same uplink time frequency resources. The eNB responds to the UE with a UE Contention Resolution Identity containing the CCCH message that was included in the message transmitted at arrow 430. The RACH process is completed after the UE receives the message 432 that matches the previously transmitted CCCH message. The temporary C-RNTI assigned to the UE then becomes its C-RNTI, which is used for subsequent data transmissions between the UE 410 and the eNB 412.

In a homogeneous network, an idle mode UE uses measurements of downlink reference signal received power (RSRP) of candidate cells in order to perform cell selection or re-selection. In other words, the UE uses the reference signal received power to determine upon which cell to camp. However, in a heterogeneous network solution, the transmit powers of the base stations may differ substantially. For example, a macro cell may transmit 22 dB more power than a pico cell. This may result in a situation where a UE close to a pico cell camps onto the macro cell, even though the path loss between the UE and the macro cell is larger than that between the UE and the pico cell.

Figure 5:
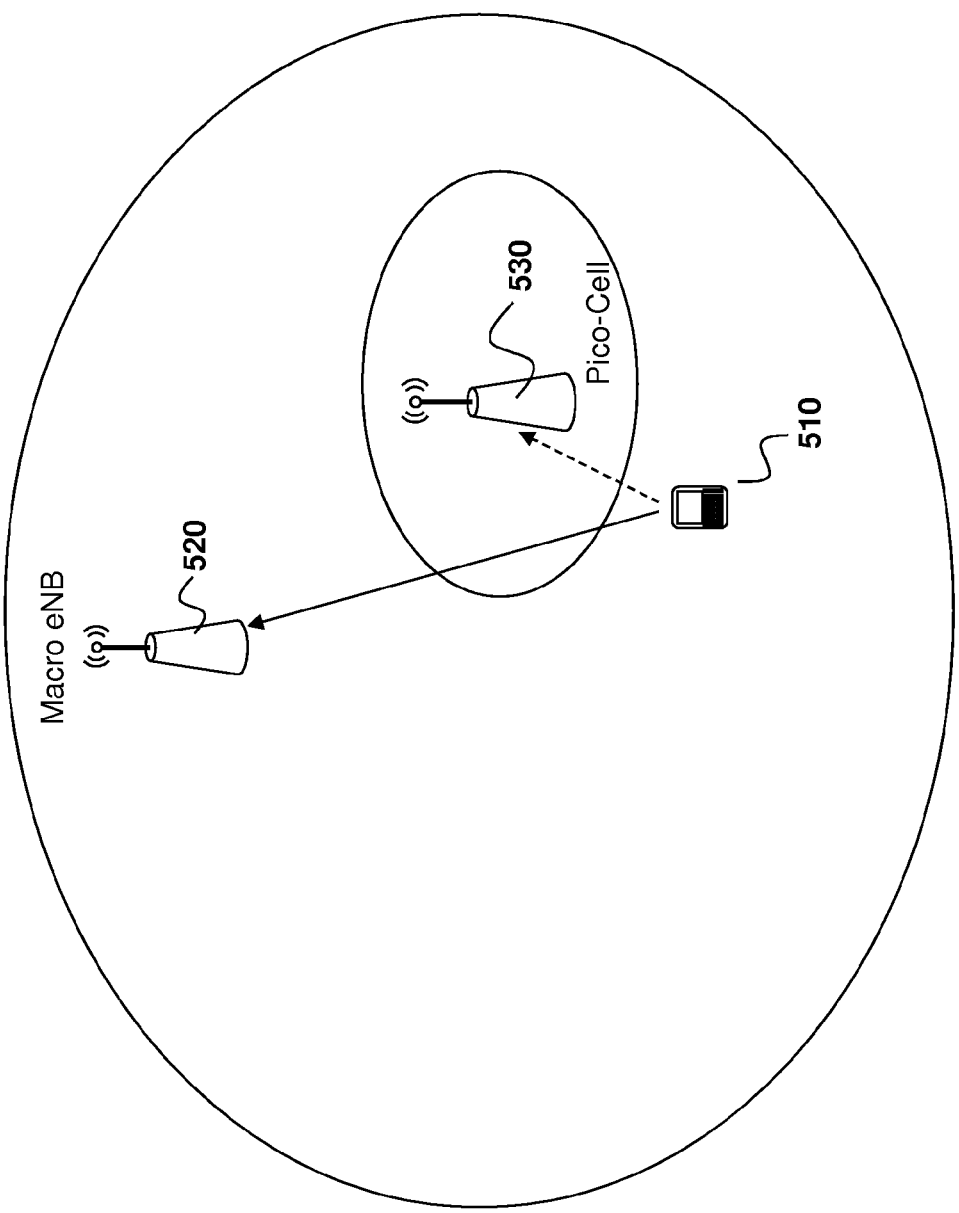
FIG. 5 is an architectural diagram of one example of a heterogeneous network showing a UE in a close to pico situation.

Reference is now made to FIG. 5, which shows a situation in which a UE 510 is connected in the uplink and downlink to macro cell 520 while the pico cell 530 is actually physically closer (and closer with regards to a reduced path loss) to UE 510.

The UE 510 camps on macro cell 520 due to the fact that the transmit power difference between the macro cell and the pico cell is larger than the path loss difference between them, hence the RSRP measured for the macro cell 520 is larger than the RSRP measured for the pico cell 530.

The UE may need to send a PRACH preamble to the macro cell eNB for uplink synchronization purposes during, for example, a transition from idle mode to connected mode. Even though the path loss from the UE to the pico cell is smaller than the path loss from the UE to the macro cell, the UE sets the initial PRACH transmission power to compensate for the larger path loss, i.e., path loss from the UE to the macro cell 520.

The result of the compensation to the transmit power is that the PRACH transmission from the UE in the macro cell, referred to herein as the macro UE, could significantly interfere with uplink reception in the pico cell 530. The interference may cause PRACH reception problems such as misdetection and false alarms in the pico cell if the PRACH resources configured in the pico cell overlap with the PRACH resources configured in the macro cell. The high power signal could also cause interference to other uplink channels and/or signals in the pico cell such as the Sounding Reference Signal (SRS) transmissions, Physical Uplink Shared Channel (PUSCH) transmissions, Physical Uplink Control Channel (PUCCH) transmissions, among others, if the resources of those uplink channels and/or signals fully or partially overlap with the PRACH resources configured in the macro cell.

The impact on the PRACH interference from the macro cell may be illustrated by way of example. In a first example, the impact of the PRACH interference from the macro cell on a PUSCH in the pico cell is considered. The physical resource allocated for PRACH in the macro cell may fully or partially overlap with the physical resources allocated for the PUSCH in the pico cell. It may be assumed that the PUSCH target received signal power is $S_{PUSCH}$ and a noise power reference level is $N_{noise}$, i.e., the target PUSCH SNR is $10 \log_{10}(S_{PUSCH}/N_{noise})$ dB; the target received signal power for PRACH in a fading channel is $S_{PRACH}$ which is $10 \log_{10}(S_{PRACH}/N_{noise})$ dB above the noise power reference level. Further, in the example it may be assumed that at least one UE is in the macro cell and is interfering with the pico cell.

Utilizing the above example, if the transmit power difference between the macro eNB and the pico eNB is 0 dB, a UE may be at the cell boundary of the pico eNB and have the same pathloss from the UE to either the macro eNB or the pico eNB. The UE may select the macro eNB as its target eNB. The UE may send a PRACH preamble to the macro eNB to reach a target received PRACH power of $S_{PRACH}$ at the macro eNB and that may result in almost the same amount of PRACH interference power at the pico eNB in the time-frequency resources overlapping with the macro-cell PRACH opportunity window. In other words, the PRACH interference power level $I_{PRACH}=S_{PRACH}$. For the PUSCH in the pico-cell, the resulting signal to interference plus noise ratio (SINR) in the resources overlapping with the macro-cell PRACH resources=$10 \log_{10} S_{PUSCH}/(N_{noise}+I_{PRACH})=10 \log_{10} S_{PUSCH}/N_{noise}-10\log_{10}(1+I_{PRACH}/N_{noise})$, which is $10\log_{10}(1+I_{PRACH}/N_{noise})$ dB less than the target PUSCH signal to noise ratio (SNR) $10\log_{10}(S_{PUSCH}/N_{noise})$. That means when there is one macro-cell UE sitting at the pico-cell boundary and sending a PRACH preamble to the macro eNB, the signal to noise ratio (SNR) for an overlapped PUSCH at the pico may, for example, be degraded by $10\log_{10}(1+I_{PRACH}/N_{noise})$ dB, which is 0.64 dB when the target PRACH power $S_{PRACH}$ in a fading channel set to −8 dB, i.e., $10 \log_{10}(S_{PRACH}/N_{noise})=10 \log_{10}(I_{PRACH}/N_{noise})=-8$ dB. If more PRACH interfering preambles sent from UEs in the macro-cell are observed by the pico eNB, the PRACH interference power level $I_{PRACH}$ may be larger and the resulting SNR degradation may be more. Also, when the transmit power difference between base stations becomes larger, the SNR will be degraded more. To be specific, when the transmit power difference becomes larger such as 5 dB, a UE sitting at the cell boundary of the pico eNB could be far away from the macro eNB (The pathloss from the UE to the macro eNB may be 5 dB larger than the path loss from the UE to the pico eNB and the UE still may select the macro eNB as its target eNB to send a PRACH preamble). In this case, if the UE enhances its PRACH transmit power to the macro eNB by 5 dB in order to overcome the 5 dB larger path loss from the UE to the macro eNB, the resulting PRACH interference power observed by the pico eNB may be increased by 5 dB as well, which means $10 \log_{10}(I_{PRACH}/N_{noise})=-3$ dB when the target PRACH power $S_{PRACH}$ in a fading channel set to −8 dB. Accordingly, the PUSCH SNR at the pico may be degraded by $10 \log_{10}(1+I_{PRACH}/N_{noise})=1.76$ dB. Following the similar calculation, it can be readily found that if the power difference is 15 dB, the degradation severity may be 7.79 dB in this example. The above shows that when there is a high transmit power difference between the macro eNB and pico eNBs, the interference from the PRACH sent to the macro by UEs in close proximity to a pico eNB may cause significant interference on other uplink resources at the pico eNB.

In a further example, the impact of PRACH interference from the macro cell on PRACH reception in the pico cell is considered. In this example, the physical resources allocated for PRACH in the macro cell are overlapped fully with the physical resources allocated for PRACH in the pico cell, a fading channel exists and at least one UE is in the macro cell, interfering with the pico cell. Similarly as that in the first example, the PRACH SNR degradation at the pico eNB is also $10\log_{10}(1+I_{PRACH}/N_{noise})$ dB. In this example, when the transmit power difference between the macro eNB and the pico eNB is 0 dB and $10\log_{10}(I_{PRACH}/N_{noise})=-8$ dB, the SNR may be degraded by 0.64 dB. However, when the transmit power difference becomes larger, such as 5 dB, and the resulting $10\log_{10}(I_{PRACH}/N_{noise})=-3$ dB, the PRACH SNR at the pico may be degraded by 1.76 dB. Further, when the transmit power difference becomes even larger at 15 dB and $10\log_{10}(I_{PRACH}/N_{noise})=7$ dB, the PRACH SNR may be degraded by 7.79 dB. Therefore, there is a need for a scheme to reduce the impact of PRACH interference from the macro cell.

In one embodiment, a macro cell UE close to a pico cell can send a PRACH preamble using a sequence from a set of macro-cell preamble sequences but using a pico-cell preamble format and a pico-cell PRACH opportunity window configured for the pico cell. In some embodiments, the macro cell UE can send such a PRACH preamble, targeting at the access node of the pico cell. In such embodiments, the macro cell UE can use a weaker transmit power than the transmit power that would be needed for sending a PRACH preamble to the macro cell, such that interference by such a PRACH preamble can be reduced. Further, the pico cell can detect the PRACH preamble and forward the detection results to the macro cell. In this regard, three sets of embodiments may be provided. In a first set of embodiments, a separate set of macro cell PRACH preamble sequences is used for uplink transmission, in the second embodiment just one set of macro cell PRACH preamble sequences is used, and in a third set of embodiments a PRACH opportunity window configured only for use by close-to-neighbor macro UEs is provided.

Second Set of Macro Cell PRACH Preamble Sequences

In accordance with one embodiment, a second set of macro cell PRACH preamble sequences is introduced. The second set is introduced in order to allow a UE to clearly indicate to eNBs whether or not the UE is in a "close-to-neighbor" situation. For example, a macro-cell UE in a "close-to-neighbor" situation may mean the UE is in a "close-to-pico" situation. As used herein, the "close-to-neighbor" situation could be when the UE sends its PRACH to any lower power node, and the use of the pico eNB in the examples below is not meant to be limiting. Also, the macro eNB could be any high power node and the use of the macro eNB in the examples below is not meant to be limiting.

Once the pico eNB detects the presence of a PRACH preamble using a sequence from a second set of PRACH preamble sequences, the pico eNB knows that the PRACH is from a UE in a close-to-neighbor situation and that the pico eNB needs to forward the detection results to the macro eNB. Alternatively, the pico eNB may simply forward all PRACH detection results corresponding to macro cell PRACH preamble sequences.

In a network with non-overlapping time frequency PRACH opportunity windows between the macro and pico cells, the second set of PRACH preamble sequences is not necessary in some embodiments, assuming that all eNBs know the fact that the PRACH opportunity windows are not aligned. This is illustrated below with regards to the second set of embodiments, where one set of macro cell PRACH preamble sequences is used.

Thus, in accordance with the first set of embodiments, a network may define a second set of macro cell PRACH preamble sequences in addition to the existing first set. The configuration of the second set could be signaled explicitly or could be performed implicitly. Examples of explicit configuration include root sequence and cyclic shifts as provided by the macro eNB explicitly. Implicit configurations include continuing on from the generation of the first-cell preamble sequence set to generate a further 64 macro cell preamble sequences possibly using the same or different root sequences and the same or different cell shift spacing.

A UE in a macro cell detects if it is in a close-to-neighbor situation. This may be done, for example, by estimating path loss from the pico cell versus the macro cell. If the macro UE is in a close-to-neighbor situation, the UE will use the PRACH configuration in the neighbor cell, i.e., in the pico-cell for its PRACH transmission except that it will select a sequence from the second set of macro cell PRACH preamble sequences. The pico cell PRACH configuration includes the time and frequency PRACH resource location and the PRACH format. The pico cell PRACH resource may be configured by the system information broadcast by the macro cell. In this case, the pico cell PRACH resource may be considered as a special macro PRACH resource only used for a UE close to the pico cell.

The pico cell monitors the preambles using either pico cell PRACH preamble sequences or macro cell PRACH preamble sequences from the newly defined second set. If a PRACH preamble using a sequence from the second set is detected by the pico cell, the pico cell needs to forward the detection results, including the detected macro PRACH preamble identifier and the associated time offset and uplink power adjustment to the macro cell.

The macro cell, in accordance with the first embodiment, monitors the possible macro cell PRACH preambles detected at the pico eNB and determines the amount of timing advance for either the macro cell or pico cell to be included in the RACH response. Basically, the macro cell decides which cell will handle the uplink reception for the UE and will set the timing advance accordingly so that the uplink data from the UE could be either synchronized at the macro eNB or at the pico eNB as appropriate. In accordance with the first set of embodiments, the UE does not need to know which cell is handling its uplink reception. Further, the overall number of PRACH resources required by the network may, in some cases, not increase. Specifically, in the case of macro PRACH resources overlapping with pico PUSCH resources, it is possible that a pico cell may need more PRACH resources to handle an increased number of UEs as some macro-cell UEs may use the pico cell PRACH resources. If there are N pico cells and each is seeing an increase of k UEs, the macro cell will see a decrease of (N*k) UEs, since those UEs have been moved from the macro to the pico cells. Thus, the macro cell will need less PRACH resources and a reduced number of macro PRACH resources means less overlapped sub-frames seeing PRACH interference from the macro cell to a PUSCH of pico cells.

Even in the overlapping sub-frames where the PUSCH of the pico cell can see PRACH interference from the macro cell, the strength of the PRACH interference may be reduced in accordance with the first set of embodiments, as the macro cell UEs close to the pico cell may be moved to using PRACH resources configured for the pico cell while other macro cell UEs are away from the pico cell and their PRACH interference is weaker.

In the case of macro PRACH resources overlapping the pico PRACH resources, there is, in one embodiment, no need to provision more PRACH resources for pico cells as the macro PRACH preambles have been seen by pico cells with and without the proposed embodiments. In effect, the first embodiment solution, the macro cell UEs in close-to-neighbor situations may use less transmit power and may use a preamble format with a shorter sequence duration $T_{SEQ}$ to send PRACH preambles as their target cell is the pico-cell, which is closer to those UEs, and macro cell PRACH interference to the pico PRACH detection may be reduced.

Details of the first set of embodiments are provided below.

Based on the above, a second set of macro PRACH preamble sequences are introduced for macro cell UEs in a close-to-neighbor situation and the preamble sequences and formats are known to the macro and pico cells. In one embodiment, the set of macro cell PRACH preamble sequences could be thought of as a set of PRACH preamble sequences for a virtual cell. The configuration of the second set could be done explicitly or implicitly. The receiving eNB can identify which preamble set was received and thus which preamble set the PRACH belongs to. The eNB can also check which eNB's downlink timing was used by the UE for its PRACH transmission.

Detection of a Close-to-Neighbor Situation

Two embodiments are provided for the UE to detect close to neighbor situation. In the first embodiment, an RSRP solution is provided. Here, a new RSRP offset parameter configurable by a network and broadcast to the UEs by each cell is provided. If a UE sees more than one cell, the UE may check the measured RSRP and the RSRP offset parameters for each observed cell to determine if the UE is in a close to neighbor situation.

More specifically, a UE sees a first cell with a measured RSRP of $RSRP_1$ dB and a network RSRP offset configuration $Offset_1$ dB, and a second cell with a measured RSRP of $RSRP_2$ dB and a network RSRP offset configuration $Offset_2$ dB. Assuming that $RSRP_1$ is greater than $RSRP_2$, the UE will select the first cell as a target cell to camp on and the UE will further check the following inequality to determine if it is in a close to neighbor situation.

$$RSRP_1 + Offset_1 > RSRP_2 + Offset_2 \quad (2)$$

If the inequality in equation (2) above holds, the UE is not in a close to neighbor situation. Otherwise, the UE is in a close to neighbor situation.

If the first cell is a macro cell and the second cell is a pico cell, the network may set $Offset_1$ equal to a negative value and $Offset_2$ to 0 dB. The above inequality then becomes to check if $RSRP_{macro}$ $RSRP_{pico}$>threshold, where the threshold is the difference between $Offset_2$ and $Offset_1$. For example, if a UE camps on the macro-cell but is physically closer to a pico-eNB, the $RSRP_{macro}$ measured by the UE may not exceed the $RSRP_{pico}$ by an amount larger than the threshold. In this case, it is reasonable for the UE to declare it is in a close-to-neighbor situation. If the UE moves away from the pico towards the macro, the $RSRP_{pico}$ may drop, the $RSRP_{macro}$ may increase, and the difference between those RSRPs may become larger. When the difference exceeds the threshold, the UE may declare it is no longer in a close-to-neighbor situation. Conversely, if a UE camps on a pico-cell and sees downlink signals from both the pico and the macro, the UE will declare it is not in a close-to-neighbor situation as camping on a pico-cell means $RSRP_{pico}>RSRP_{macro}$ and with $Offset_{pico}=0$ dB and a negative $Offset_{macro}$, this inequality $RSRP_{pico}+Offset_{pico}>RSRP_{macro}+Offset_{macro}$ holds.

In another embodiment, the network could configure an RSRP difference threshold for each cell. A UE camping on the first cell can check if the RSRP from the first cell minus the RSRP from the second cell is larger than the RSRP difference threshold configured by the first cell. If the result is true, the UE is not in a close to neighbor situation. Otherwise, the UE is in a close to neighbor situation (the UE is closer to the second cell than to the first cell).

As will be appreciated by those in the art having regard to the above, the above can handle scenarios where pico eNBs do not have the same transmit power and the network wishes to disallow a UE camping on a pico-cell to declare it is in a close-to-neighbor situation and to use another pico-cell's PRACH opportunity window. In this case, the network may set the same RSRP Offset value for all pico cells so that equation (2) becomes $RSRP_1>RSRP_2$, meaning the condition for a UE to declare not in a close-to-neighbor situation is the same as the condition for the UE to choose a cell to camp on. In this case, if the UE sees two pico eNBs, the UE will still pick the pico eNB with the stronger RSRP to send a PRACH preamble to. If an RSRP difference threshold is used instead of an RSRP offset value, the network can set the RSRP difference threshold to 0 dB to disallow a UE camping on a pico-cell to declare it is in a close-to-neighbor situation.

In accordance with the above, although UEs do not know if they are in a macro-cell or a pico-cell, the network can configure RSRP offset values to let UEs identify if they are in a close-to-neighbor situation. For the UEs in the macro-cell and identifying themselves in a close-to-neighbor situation, those UEs are actually in a close-to-pico situation. As a result, those UEs will use the PRACH opportunity window configured by the pico eNB to send the PRACH preambles using the macro-cell PRACH preamble sequences as a means to reduce PRACH interference to the pico cell and to indicate to the network that the UEs still want to camp on the macro cell as the downlink signal from the macro eNB is stronger.

In one embodiment, the UE may only perform the detection of a close to neighbor situation when it sees more than one cell. The RSRP measurements are done by UEs in any case during cell selection and cell reselection in order to find neighbor cells.

In a second determination scheme for determining whether a UE is in a close-to-pico situation, i.e., a close-to-neighbor situation as the UE is not aware whether it is in a macro or a pico-cell, a path-loss based solution may be used. In the path-loss based solution, a UE can estimate the downlink path loss from each cell to the UE. If the path loss from a neighbor cell is smaller than the path loss from a target cell by a pre-defined amount, the UE can determine that it is in a close to neighbor situation. In order to do this, in one embodiment UEs may need to decode broadcast messages from more than one cell to know the transmit powers of each cell. The transmit powers can be compared to the measured received powers in order to estimate the downlink power losses.

A path loss offset parameter may also be introduced so that a close-to-neighbor situation is determined only when the sum of the path loss and the path loss offset in one cell is less than the sum in its neighbor cell. To be specific, if a UE sees a first cell with an estimated downlink path loss $PL_1$ dB and a network path loss offset configuration $PL\_Offset_1$ dB, and a second cell with an estimated downlink path loss $PL_2$ dB and a network path loss offset configuration $PL\_Offset_2$ dB and the UE camps on the first cell, the UE may further check the following inequality to determine if it is in a close to neighbor situation $$PL_1 + PL\_Offset_1 > PL_2 + PL\_Offset_2 \quad (3)$$

If the inequality in equation (3) holds, the UE is in a close to neighbor situation. Otherwise, the UE is not in a close to neighbor situation. For example, if the first cell is a macro cell and the second cell is a pico cell, the network may set $PL\_Offset_1$ to a negative value and $PL\_Offset_2$ to 0 dB. In this case, equation (3) becomes $PL_1 > PL_2$ +threshold, where threshold is the difference between $PL\_Offset_2$ and $PL\_Offset_1$. Thus if a UE camps on the macro cell (the first call) and sees the path loss from the first cell is larger than the one from the second cell plus a threshold, the UE may declare it is in a close to neighbor situation. Conversely, if a UE camps on the pico cell (the first cell becomes the pico cell), the inequality in equation (3) will not hold and the UE may declare it is not in a close to neighbor situation. Alternatively, a path loss difference threshold can be introduced for each cell. A UE camping on the first cell can check if the downlink path loss of the first cell minus the downlink path loss of the second cell is larger than a path loss difference threshold configured by the first cell. If the result is true, the UE is in a close to neighbor situation. Otherwise, the UE is not in a close to neighbor situation. If a network wishes to disallow UEs from using neighbor-cell PRACH opportunity windows to send PRACH preambles, the network can simply set a larger path loss difference threshold for each cell.

Further, alternative to decoding broadcast messages from more than one cell, if pico cells have the same maximum transmit power, the maximum transmit power of the pico cell or the difference in the maximum transmit power with respect to that macro cell can be included in the broadcast messages from the macro cell for the UE so that the UE does not need to decode the broadcast messages from the pico cell. Thus, in accordance with the above, the UE can detect when it is in a close-to-neighbor situation.

UE PRACH Transmission Procedure

Figure 6:
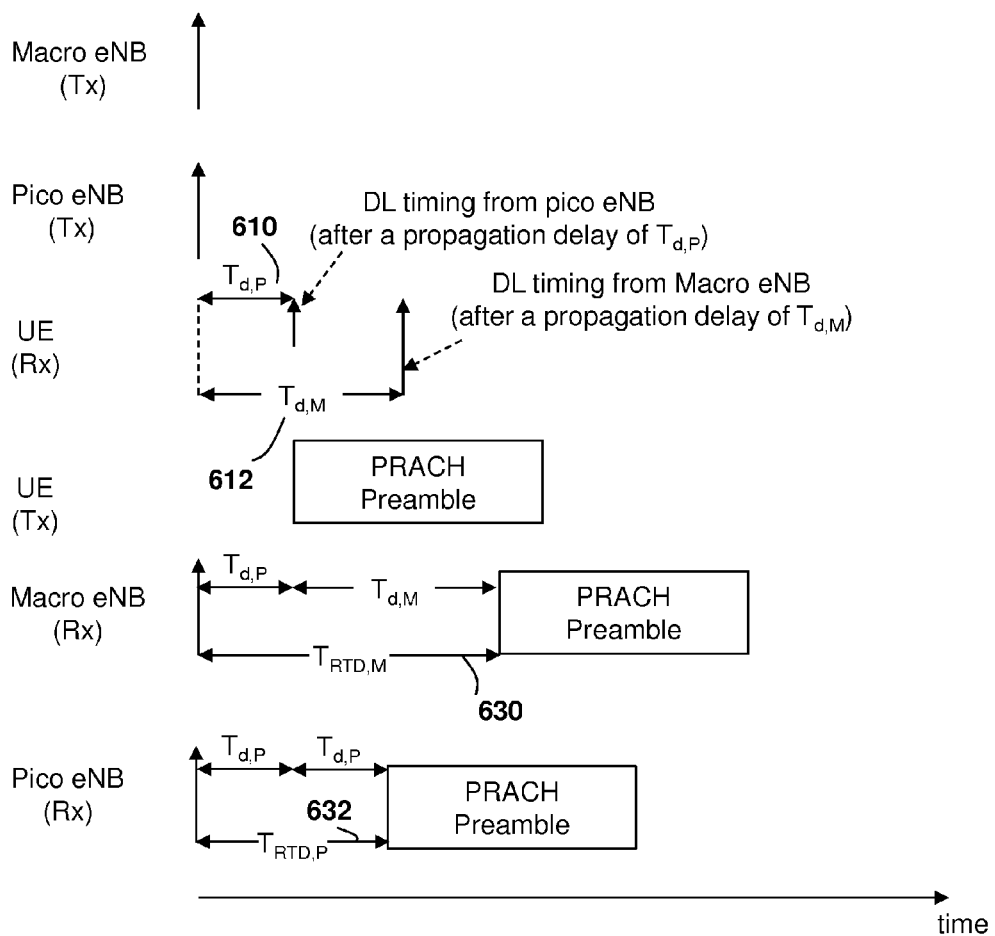
FIG. 6 is a timing diagram showing round trip delay associated with a PRACH preamble transmission time synchronized to pico cell downlink time according to one embodiment.

For a macro cell UE in a close-to-pico situation, i.e., a macro-cell UE identifies itself in a close-to-neighbor situation, the UE may wish to use a macro-cell PRACH preamble sequence during pico-cell PRACH opportunity. The UE uses the time of arrival (TOA), in one embodiment, of the downlink signal from the pico cell as its PRACH transmission time reference. The PRACH transmission time reference may affect the over the air (OTA) round trip delay (RTD) seen at an eNB. Reference is now made to FIG. 6.

In the example of FIG. 6, a time-synchronous network is assumed. At the macro eNB, the macro eNB may monitor all preambles using macro cell PRACH preamble sequences and associated round trip delays (RTD). The macro eNB may monitor the PRACH detection report from pico eNBs and associated RTDs. The RTD detected at the pico eNB may be different from that detected at the macro eNB. In particular, reference is made to FIG. 6, which shows the round trip delay including the one-way propagation delay $T_{d,P}$ from the pico to the UE may be different from the one-way propagation delay $T_{d,M}$ from the macro cell to the UE. This is shown, for example, by arrows 610 for $T_{d,P}$ and 612 for $T_{d,M}$ respectively.

As seen in FIG. 6, at the macro eNB, the round trip delay 630 is equal to the propagation delay $T_{d,P}$ from the pico to the UE 610 plus the propagation delay from the UE to the macro, which is approximately equal to the propagation delay $T_{d,M}$ from the macro to the UE 612, whereas at the pico eNB, the round trip delay 632 is the propagation delay $T_{d,P}$ from the pico to the UE 610 plus the propagation delay from the UE to the pico, which may be equal to the propagation delay $T_{d,P}$ from the pico cell to the UE 610. The round trip delay difference between the round trip delay $T_{RTD,M}$ 630 at the macro eNB and $T_{RTD,P}$ 632 at the pico eNB is approximately equal to the one-way propagation delay difference between $T_{d,M}$ and $T_{d,P}$, which is less than a worst case one-way propagation delay in the macro-cell when the UE is at the macro-cell boundary. In one embodiment, this property may be used to determine if PRACH preambles with a same preamble sequence number detected at more than one eNB were likely sent by a same UE.

Further, in one embodiment, relative eNB timing between the pico eNB and the macro eNB in a non time-synchronous network is known and can be compensated for in the RTD calculation.

The network can make use of the detected RTD to determine the timing advance to be included in a RACH response to the UE. Upon the reception of the RACH response from the network, the UE may keep using the time of arrival of the downlink signal from the pico eNB as a time reference to adjust the uplink transmission time for future uplink transmissions by the amount of timing advance specified in the RACH response. The detected RTD used by the network to determine the amount of timing advance for the UE could be a delay, i.e., a time offset, detected at the macro eNB or a delay detected at the pico eNB. If the former is used, future uplink transmissions from the UE may be time synchronized at the macro eNB and the macro eNB may handle the uplink reception for the UE. If the latter is used, future uplink transmissions from the UE may be time synchronized at the pico eNB and the pico eNB may handle the uplink reception for the UE.

Figure 7:
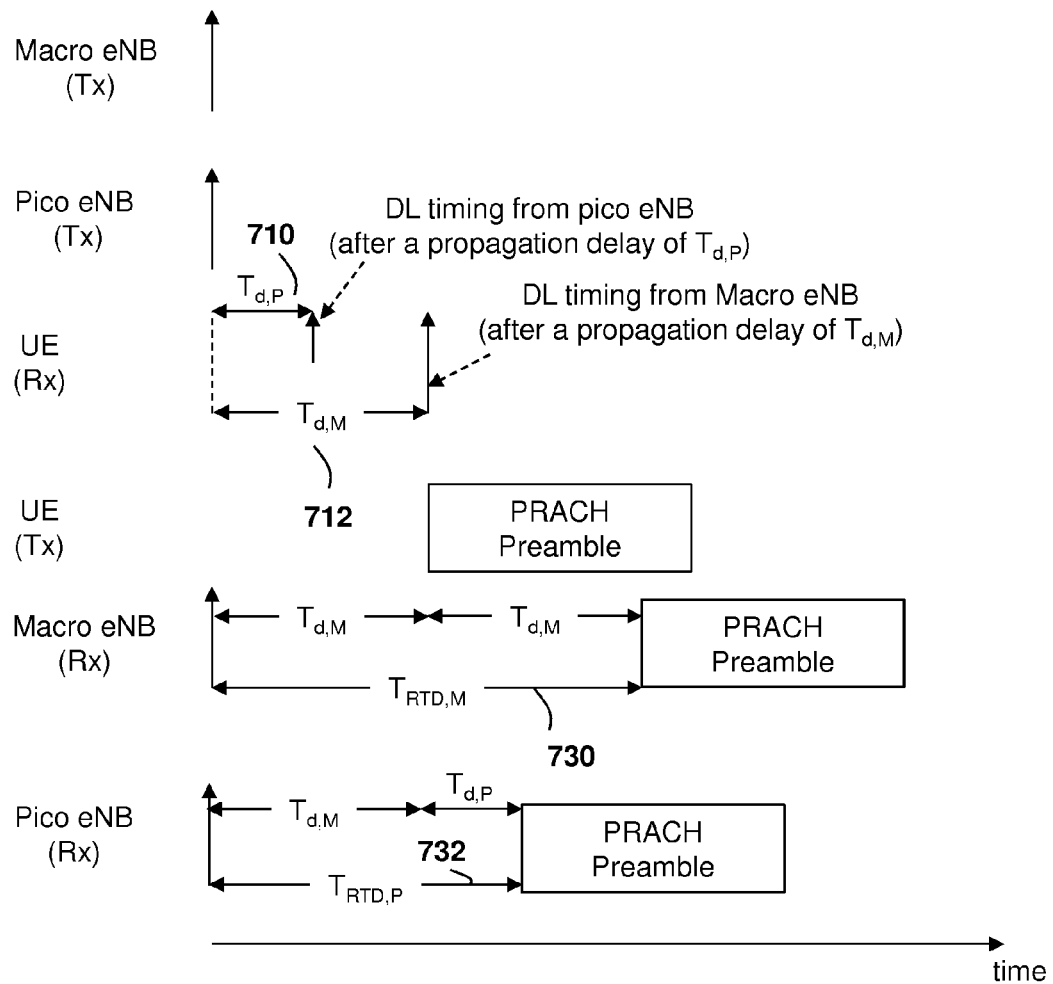
FIG. 7 is a timing diagram showing round trip delay associated with a PRACH preamble transmission time synchronized to macro cell downlink time according to one embodiment.

In an alternative, the UE may use the time of arrival for the downlink signal from the macro eNB as its PRACH transmission time reference. Further, the time of arrival of the PRACH at the pico eNB, $T_{RTD,P}$ will be equal to $T_{d,M} + T_{d,P}$. Reference is now made to FIG. 7. In FIG. 7, the pico eNB round trip delay is seen to differ from that of FIG. 6 in which the round trip delay is approximately equal to twice the propagation delay from the pico to the UE.

In particular, reference is made to FIG. 7, in which, at the macro eNB, the round trip delay 730 is equal to twice the propagation delay $T_{d,M}$ from the macro to the UE 712, whereas at the pico eNB, the round trip delay 732 is equal to the propagation delay $T_{d,M}$ from the macro to the UE 712 and the propagation delay from the UE to the pico eNB, which is approximately equal to the propagation delay $T_{d,P}$ from the pico to the UE 710. Again, the round trip delay difference between the round trip delay $T_{RTD,M}$ 730 at the macro eNB and $T_{RTD,P}$ 732 at the pico eNB is approximately equal to the one-way propagation delay difference between $T_{d,M}$ and $T_{d,P}$, which is less than a worst case one-way propagation delay in the macro-cell when the UE is at the macro-cell boundary. This property may be used to determine if PRACH preambles with a same preamble sequence number detected at more than one eNB were likely sent by a same UE.

The larger time of arrival of FIG. 7 of the PRACH means a larger guard time may be considered when the pico eNB configures a PRACH format for UEs in the pico cell to use and a larger guard time may potentially increase the amount of physical resources that need to be allocated for the PRACH.

Returning to FIG. 7, a UE, regardless of whether or not it is in a close to neighbor situation generally uses the time of arrival of the stronger downlink signal from the macro eNB as its time reference. The network can use the detected RTD at the macro eNB to determine the timing advance to be included in a RACH response to the UE. In this case, future uplink transmissions from the UE may be time synchronized at the macro eNB and the macro eNB may handle the uplink reception for the UE. If the detected RTD at the pico eNB is used by the network to determine the timing advance, future uplink transmissions from the UE may be time synchronized at the pico eNB and the pico eNB may handle the uplink reception for the UE.

In accordance with the first set of embodiments, the UE may select a sequence from the second set of macro cell PRACH preamble sequences according to the macro PRACH configuration and it may determine the initial PRACH transmit power in accordance with the following. The UE uses the pico cell as the target eNB to calculate its PRACH transmit power. In this case, the pico cell may detect the PRACH preamble that used one sequence from the second set of macro-cell PRACH preamble sequences. In addition, a power offset may be added to the calculated PRACH transmit power and thus the macro cell as well as the pico cell may detect the PRACH preamble if the network wishes. The possible power offset could be a network configurable power offset and in one case may come from the macro cell. Alternatively, the offset may be set to cover the path loss difference between the macro cell and the pico cell. The power offset configuration may allow some network flexibility in detecting the PRACH preambles, i.e., detecting at pico cells only or detecting at both the macro cell and pico cells, from the macro cell UEs in a close-to-neighbor situation.

If the network does not need the macro cell to detect the PRACH preambles from the macro cell UEs in a close-to-neighbor situation and wants to rely on the PRACH detection in the pico cells, the network may set the power offset to be 0 dB.

Further, the UE may select a sequence from the second set of macro cell PRACH preamble sequences to indicate to the eNBs that the UE is time synchronized to the pico cell downlink time for its PRACH transmission. For a UE that is not in a close-to-neighbor situation, the UE may select a sequence from a first set of macro cell PRACH preamble sequences to indicate to eNBs that the UE is time synchronized to the macro cell downlink time for its PRACH transmission.

Further, the UE may wait for a pico cell PRACH time or frequency opportunity to send a PRACH preamble. If within the pico cell PRACH opportunity, the UE may send a preamble using a macro cell PRACH preamble sequence and using a pico-cell preamble format.

Figure 8:
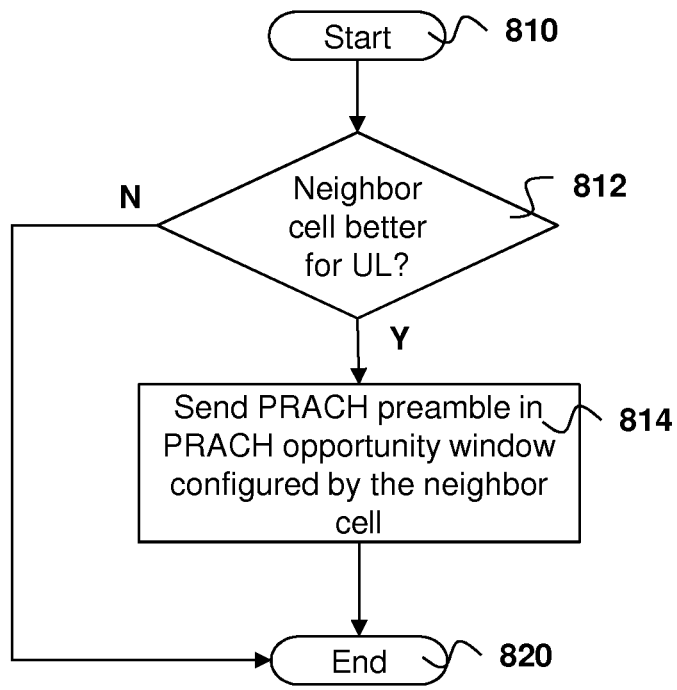
FIG. 8 is a process diagram at a UE for selecting a PRACH preamble and a PRACH opportunity window according to one embodiment.

Reference is now made to FIG. 8. FIG. 8 shows a process from a UE side for sending a PRACH preamble. The process of FIG. 8 starts at block 810 and proceeds to block 812 in which the UE detects that the neighbor network node is better for uplink data transmissions than the target cell, i.e., the cell on which the UE has camped. Specifically, in a cell, the UE detects that it is in a close-to-neighbor situation and that uplink traffic should go to the neighbor cell.

From block 812, the process proceeds to block 814 if the neighbor cell is better for uplink transmissions than the target cell. At block 814 the process sends, in a physical random access channel opportunity window configured by the neighbor cell to the neighbor cell, a PRACH preamble using a sequence from the second set of PRACH preamble sequences defined by the target cell but a preamble format configured by the neighbor cell. The random access preamble is thus destined for or directed to the target cell and sent through the neighbor cell.

The process then proceeds to block 820 and ends.

eNB Side Functionality

Figure 9:
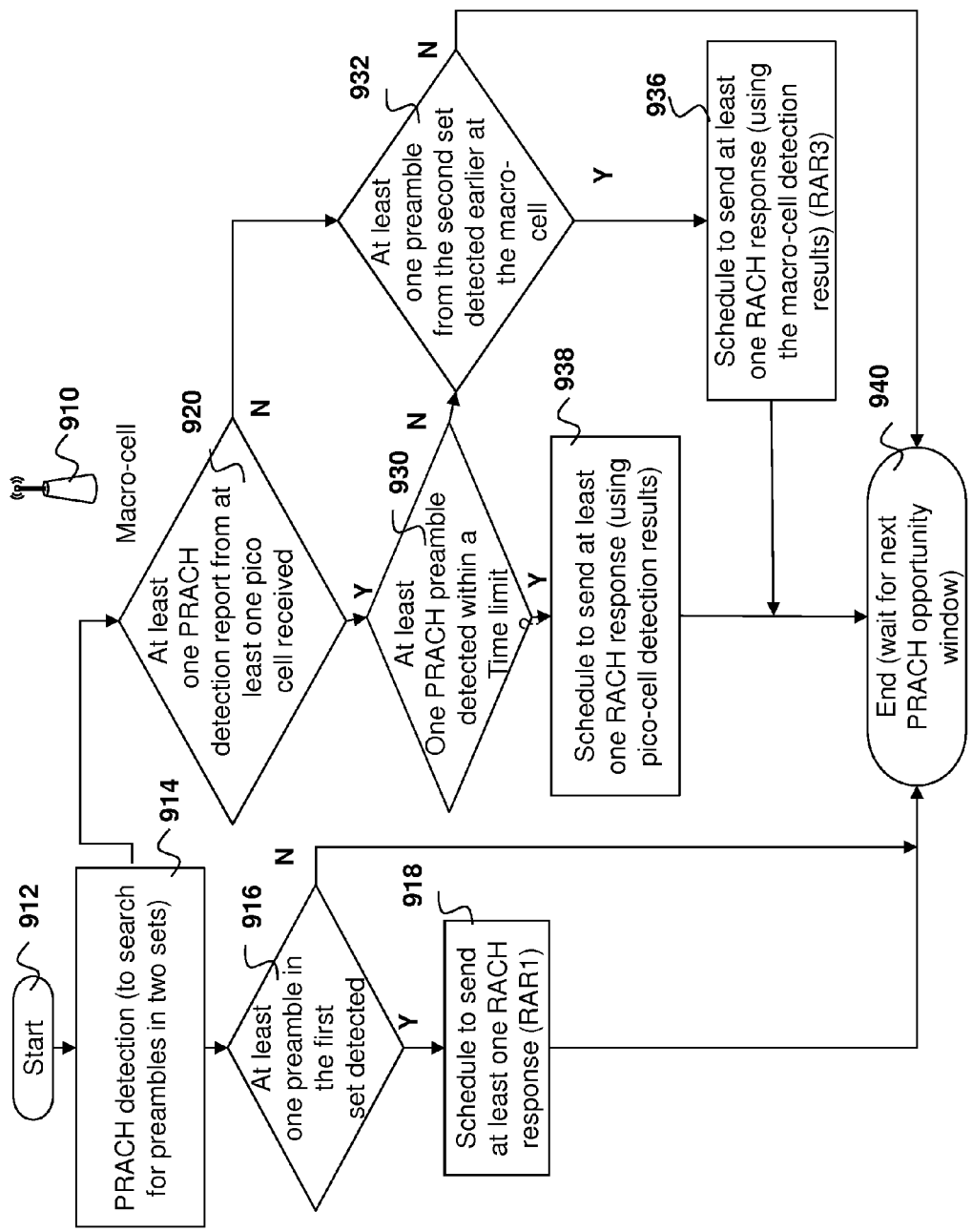
FIG. 9 is a process diagram showing a process at a macro eNB for detecting a PRACH preamble when two sets of PRACH preambles are used according to one embodiment.
Figure 10:
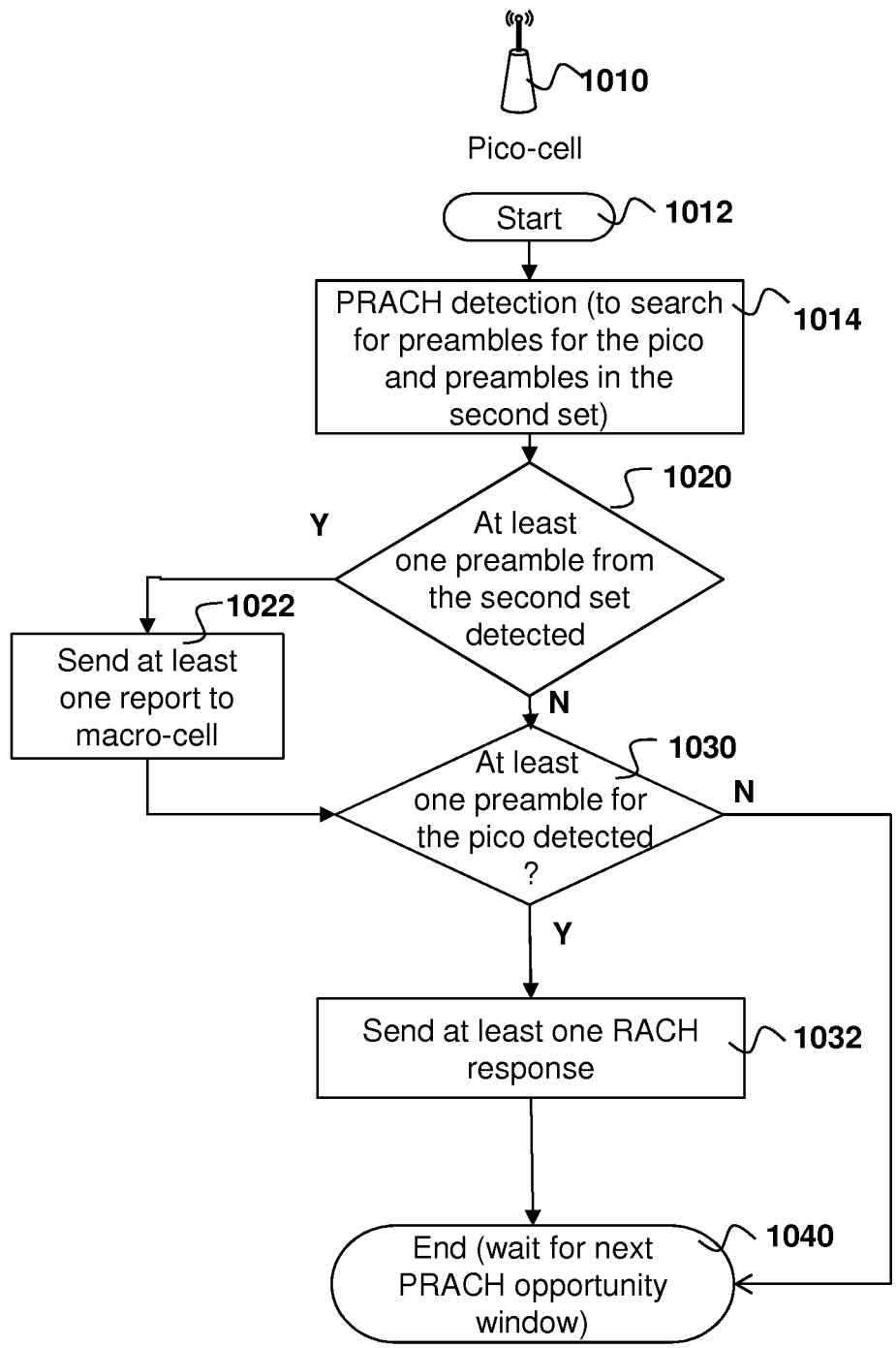
FIG. 10 is a process diagram showing a process at a pico eNB for detecting a PRACH preamble when two sets of PRACH preambles are used according to one embodiment.

Reference is now made to FIGS. 9 and 10. In FIG. 9, a macro cell 910 starts the process at block 912 and proceeds to block 914 in which PRACH detection is performed. In the macro cell, the macro eNB looks for PRACH preambles that are directed to the macro cell. In one embodiment, this could be the preambles in the first set, i.e., the preambles using a macro cell preamble format and a sequence from the first set of PRACH preamble sequences for the macro cell and/or the preambles in the second set, i.e., the preambles using a pico cell preamble format and a sequence from the second set of PRACH preamble sequences that are sent to a pico cell by the macro-cell UEs in a close-to-neighbor situation.

The process proceeds in parallel from block 914 to block 916 and 920. At block 916, a check is made to determine whether at least one PRACH preamble from the first set is detected at block 914. If yes, the process proceeds to block 918 in which scheduling may be done for each of at least one detected PRACH preamble to send a RACH response to the UE that sent the PRACH preamble (RAR1). The combination of blocks 916 and 918 is used for UEs that are being served in both the uplink and downlink by the macro cell.

The process proceeds from block 918 to block 940 and ends. Also, if the check at block 916 does not detect at least one PRACH preamble in the first set then the process proceeds to block 940 and ends.

At block 920 the macro cell 910 checks if at least one PRACH report from at least one pico cell has been received. If yes, the process proceeds to block 930. Otherwise, the process proceeds to block 932 in which a check is made to see if at least one PRACH preamble in the second set was detected earlier.

The process at block 930 determines whether at least one PRACH preamble included in the at least one report was detected within a certain time limit $T_o$. The time limit $T_o$ is used to account for transport delays for the at least one report to arrive at the macro cell from the at least one pico cell. To be specific, at the current time instant t, the macro-cell checks each PRACH preamble included in the at least one report and determines if the PRACH preamble detected at the pico-cell was detected within the time period from $t-T_o$ to t. In one embodiment, $T_o$ is set to 10 subframes, i.e., 10 milliseconds. If no PRACH preamble from the at least one report was detected within the time limit, then the process may proceed from block 930 to block 932 in which a check is made to see if at least one PRACH preamble in the second set was detected earlier at the macro-cell, i.e., within the time period from $t-T_o$ to $t-T_o+T_1$ at the detection at block 914. Here $T_1$ is a time interval between the current PRACH opportunity window and the next PRACH opportunity window. The reason for that is block 930 for the current PRACH opportunity window checks the time period from $t-T$ to t while block 930 for the next PRACH opportunity window checks the time period from $t-T_o+T_1$ to $t+T_1$. So, if there was a PRACH preamble from the second set detected in block 914 by the macro cell and within the time period from $t-T$ to $t-T_o+T_1$, for which either the PRACH preamble was not detected in any pico-cell or its detection report has not arrived at the macro-cell at time instant t, the macro-cell may use the PRACH preamble. If no, the process proceeds from block 932 to block 940 and ends and waits for the next PRACH opportunity window.

If the macro cell did find at least one preamble in the second set at block 914 within the time period from $t-T$ to $t-T_o+T_1$, the process proceeds from block 932 to block 936 in which scheduling for each of the at least one preamble is made to send a RACH response using the macro cell detection result, of which the detected round trip delay is used to determine the amount of timing advance for the uplink transmission that the UE needs to perform. The UE will be uplink synchronized with the macro cell in block 936 since the round trip delay observed at the macro eNB is used to determine the amount of timing advance.

From block 936 the process proceeds to block 940 and ends.

From block 930, if at least one PRACH preamble was detected within the time limit, then the process proceeds to block 938 and a RACH response for each of the at least one PRACH preamble is scheduled to be sent where the round trip delay reported by the pico-cell is used to determine the amount of timing advance for the UE that sent the PRACH preamble, resulting in the UE being uplink synchronized to the pico cell. This is because the report from the pico cell reported the round trip delay observed by the pico-cell and the timing advance adjustment to be performed by the UE is to make the uplink timing synchronized to the pico-cell. In this case, the UE will be uplink serviced by the pico-cell.

From the pico cell perspective reference is made to FIG. 10. The pico cell 1010 process starts at block 1012 and proceeds to block 1014 in which a PRACH detection occurs. In the case of block 1014, the PRACH detection includes both the PRACH detection for PRACH preambles directed to the pico cell, i.e., preambles for the pico, as well as PRACH preambles in the second set directed for the macro cell (the preambles using a preamble format configured by the pico-cell but a sequence from the second set of macro-cell PRACH preamble sequences).

The process then proceeds to block 1020 in which a check is made to determine whether or not at least one PRACH preamble from the second set is detected. If yes, the process proceeds to block 1022 in which at least one report for at least one PRACH detection result is sent to the macro cell. There is a maximum time limit within which a random access response must be received by the UE in response to a transmitted PRACH preamble. The maximum time limit is 10 milliseconds in one embodiment, starting from three sub frames after completing the transmission of a PRACH preamble. In 3GPP LTE, each subframe is 1 millisecond in duration. If three milliseconds is budgeted for these four processes: performing a PRACH detection at the pico eNB; sending a PRACH report 1022 from the pico eNB; decoding the PRACH report from the pico eNB at the macro eNB; and preparing a RACH response by the macro eNB, the latency over a fast wireline link or a wireless link may need to be, in one embodiment, less than 10 milliseconds.

In cases where a network's backhaul implementation cannot guarantee that the macro cell can receive the PRACH detection report from a pico cell within a specified time limit, the network may need to seek a wireless connection, increase the maximum time limit on the RACH response time for UEs using the PRACH preamble sequences from the second set ($T_o$ is set to a larger value), or disable the feature that allows macro UEs to use the neighbor-cell PRACH opportunity windows to send PRACH preambles.

From block 1020, if no PRACH preamble is found, or from block 1022, the process proceeds to block 1030 in which a check is made to determine whether at least one pico cell PRACH preamble is detected. If yes, then the pico cell sends at least one RACH response at block 1032 i.e., sends a RACH response for each of the at least one pico cell PRACH preamble detected in block 1014 to at least one UE. The process then proceeds from block 1032 to block 1040 and ends. Further, from the pico cell PRACH preamble check at block 1030, if no pico cell PRACH was found the process also proceeds to block 1040 and ends. At block 1040, the ending indicates that the process will wait for the next PRACH opportunity window before starting again.

In one case, the embodiments of FIGS. 9 and 10 utilize a time synchronized network with aligned PRACH opportunity windows. Since both the macro cell and pico cell use time and frequency aligned physical resources as PRACH opportunity windows, the macro cell can detect the PRACH preamble from the UE using a sequence from the second set of macro cell PRACH preamble sequences and with time referenced to the pico cell downlink time in the same way that the macro cell detects the PRACH preamble from the UE using a sequence from the first set of macro cell PRACH preamble sequences with time referenced to the macro cell downlink time. If a UE uses a pico cell downlink timing reference to send a PRACH preamble, the time of arrival of a PRACH preamble at the macro eNB from the UE is equal to $t_{OWD,Pico \to UE} + t_{OWD,UE \to Macro}$, where $t_{OWD,a \to b}$ is an over the air one way delay from point A to point B.

As a comparison, if a UE uses the macro cell downlink timing reference to send a PRACH preamble, the time of arrival of a PRACH preamble at the macro eNB from the UE is $t_{OWD,Macro \to UE} + t_{OWD,UE \to Macro}$.

In both cases, the macro cell can detect the time of arrival and can use it as a reference to determine the amount of timing advance needed to instruct the UE to adjust its uplink transmission time.

Further, because the PRACH preamble transmit power will be adjusted based on the pico cell, the PRACH received at the macro eNB may have a reduced power and the PRACH detection performance for the PRACH preambles in the second set may be affected. As a result, the macro eNB may need to rely on the PRACH detection from pico cells by checking if a PRACH detection report from any pico cell is received. However, if the network wishes, the PRACH detection results from a macro cell can still be used in case no PRACH detection reports from pico cells are received within a certain time limit $T_o$. In this case, the UE may be uplink time synchronized to the macro cell, as shown at block 936 of FIG. 9. This would work regardless of which cell the UE used for its PRACH time reference to send a PRACH preamble as the time of arrival of the PRACH preamble at the macro eNB is the time difference to be adjusted. Further, upon the reception of a timing advance command from the macro cell, a UE that used the pico cell as its PRACH transmission time reference may continue using the pico cell as a time reference to do a timing advance adjustment. As will be appreciated by those in the art, a UE that used the pico cell as its PRACH transmission time reference to send a PRACH preamble may also change to use the macro cell as its current time reference before it receives a RACH response. In this case, the amount of time reference change may be compensated when the UE receives a RACH response and applies the timing advance adjustment in the RACH response as the timing advance adjustment with respect to the pico-cell time reference Random Access Response Procedure Although the UE transmits a macro cell PRACH preamble to the pico cell, the UE may still monitor the downlink signal from the macro eNB as the macro cell is the cell the UE camps on and the downlink signal from the macro eNB is stronger. Therefore, the corresponding random access response message is transmitted from the macro eNB. If the network decides to use the PRACH detection results from the pico eNB to determine the RACH response to the UE, the timing advance command, power control command and uplink grant are associated to the pico cell, and thus the pico cell may demodulate the uplink data from the UE. This is beneficial in the case where the pico cell is better from the uplink transmit power point of view, while the macro cell is better from the downlink received signal point of view. Alternatively, the macro eNB could direct the UE to transmit uplink signals targeting to the macro cell by including a reference uplink cell indicator in the random access response message or radio resource control (RRC) signaling. In this case, the UE adjusts the power control and timing based on downlink signal of the macro cell.

Pico Cell Detection of a Macro Cell Preamble from One Set of Macro Cell PRACH Preamble Sequences In a second set of embodiments, the solution is the same as that described above except that only one set of macro cell PRACH preamble sequences is available to use.

In essence, in accordance with the second set of embodiments, in a network with overlapping time frequency PRACH opportunity windows between the macro and pico cells, once a pico eNB detects the presence of a PRACH preamble using a sequence from a set of macro cell PRACH preambles sequences, the pico eNB may simply forward the PRACH detection results to the macro eNB as the pico eNB may not know whether or not the preamble was from a macro-cell UE in a close-to-neighbor situation. Alternatively, if the macro cell and pico cell use different preamble formats, the pico eNB may be able to detect preambles that are in a pico cell preamble format but use a macro-cell preamble sequence and determine that those are from macro-cell UEs in a close-to-neighbor situation and only forward those PRACH detection results to the macro cell.

Further, in a network with non-overlapping time frequency PRACH opportunity windows between the macro and pico cells, once a pico eNB detects the presence of a PRACH preamble from a set of macro cell PRACH preamble sequences, it may know that it needs to forward the detection results to the macro eNB. Here, it is assumed that eNBs know the fact that the PRACH opportunity windows are not aligned between the macro and pico cells. Thus, if a UE in a macro cell detects that it is in a close-to-neighbor situation, which means the UE is closer to the pico cell than the macro cell, the UE may select one sequence from the set of macro cell PRACH preamble sequences and send a PRACH preamble towards the pico cell in the PRACH opportunity windows configured by the pico cell. This means any PRACH preambles using the macro cell PRACH preamble sequences detected in the pico-cell PRACH opportunity windows, which are not overlapping with the macro-cell PRACH opportunity windows, must be from the macro-cell UEs that identified themselves in a close-to-neighbor situation.

The pico cell monitors the preambles using either pico cell PRACH preamble sequences or the preambles using macro cell PRACH preamble sequences. If a PRACH preamble using a macro-cell PRACH preamble sequence is detected, the pico cell forwards the detection results to the macro cell.

The macro cell monitors the potential PRACH detection results from pico cells and also detects the PRACH preambles that use the macro cell PRACH preamble sequences. For preambles detected at the macro eNB, the macro eNB can check for each detected preamble if the associated delay is less than a delay threshold to determine if the UE sending the preamble is likely close to a macro cell, which is unlikely in a close-to-neighbor situation, and the macro cell can send a RACH response without waiting for potential PRACH detection reports from pico cells. Alternatively, a macro-cell may determine if a PRACH preamble from the same UE was detected in both the macro cell and at least one pico-cell and decide from which cell the PRACH detection result for the PRACH preamble should be used after checking the pico cell's report by comparing at least one of the preamble identifier, random access network temporary identifier, associated delay, uplink power control adjustment, or the received power for the PRACH preamble which was detected in both the macro cell and at least one pico cell. An associated delay is also referred to as a time offset. For example, if PRACH preambles detected in the macro-cell and at least one pico-cell have the same preamble identification number, same random access network temporary identification number, and the difference between their time of arrivals is less than the worst case one-way propagation delay of the macro-cell, the macro-cell may determine those PRACH preambles detected at different eNBs were likely replicas of one PRACH preamble from a same UE. If the preamble from the same UE is determined and if the pico-cell detection has a smaller amount in at least one of the associated delay and uplink power control adjustment than that detected in the macro-cell or has a higher received power than that detected in the macro-cell, then a RACH response would be sent using the PRACH detection results at the pico-cell, including at least one of associated delay, the uplink power control adjustment, or the received power detected in the pico-cell. Otherwise, the PRACH detection results detected in the macro-cell would be used in the RACH response. If a preamble is detected at the pico cell but not detected at the macro cell, the PRACH detection results from the pico cell are used to determine a RACH response to be sent by the macro cell to the UE.

Thus, in accordance with the second set of embodiments, no second set of macro cell PRACH preamble sequences needs to be defined.

With regard to PRACH detection, two cases are considered. In a first case, the macro and pico cells have non-overlapping PRACH opportunity windows. In a second case, the PRACH opportunity windows for the macro and pico cells are overlapping.

Figure 11:
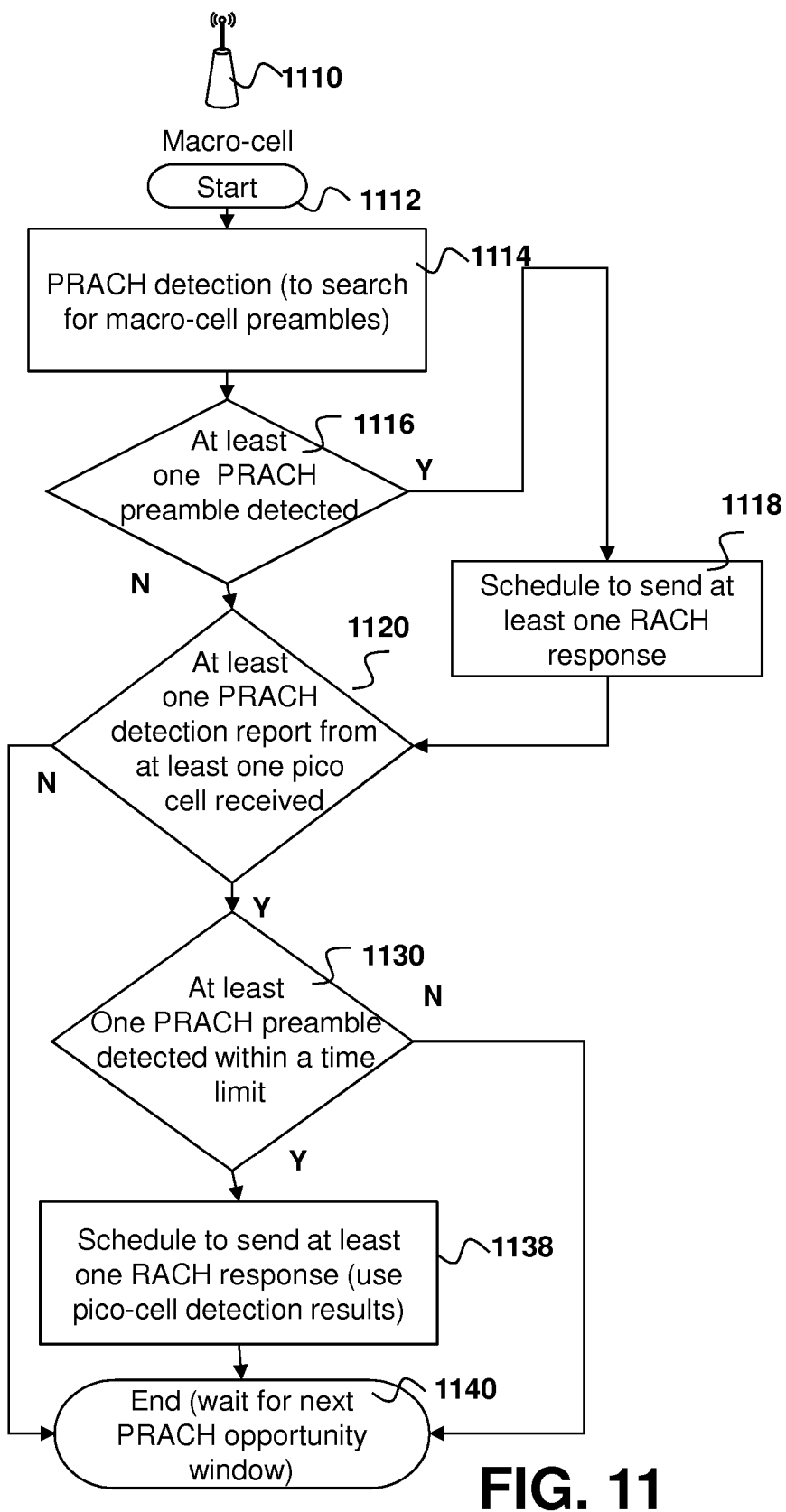
FIG. 11 is a process diagram showing a process at a macro eNB for detecting a PRACH preamble when one set of PRACH preambles is used and the macro and pico cells have non-overlapping opportunity windows according to one embodiment.

Reference is now made to FIG. 11, which shows the process of a macro cell with non-overlapped PRACH opportunity windows.

From macro cell 1110, the process starts at block 1112 and proceeds to block 1114 in which a PRACH detection is made to search for macro cell PRACH preambles. Here, the macro cell PRACH preambles are the preambles that use a sequence from the set of macro cell PRACH preamble sequences and they include the preambles using a macro cell preamble format and the preambles using a pico cell preamble format.

The process then proceeds to block 1116 in which a check is made to see whether or not at least one PRACH preamble was detected. If yes, the process proceeds to block 1118 and schedules and sends at least one RACH response, i.e., a RACH response for each of the at least one detected PRACH preamble.

Conversely, if no PRACH preamble was found at block 1116 the process proceeds to block 1120 in which a check is made to see if at least one PRACH detection report was received from at least one pico cell. If yes, the process proceeds to block 1130. Otherwise, the process proceeds to block 1140 and ends.

The process at block 1130 checks to see whether at least one PRACH preamble included in the at least one report was detected within a certain time limit $T_o$. If the current time instant is denoted by t, a PRACH preamble is said to be detected within the time limit $T_o$ if the PRACH preamble was detected within the time period from $t-T_o$ to t. If no, then the process proceeds to block 1140 and ends.

Conversely, if at least one PRACH preamble was detected within the time limit then the process proceeds to block 1138 and schedules to send a RACH response for each of the at least one PRACH preamble detected within the time limit using the pico cell detection results to at least one UE. The at least one UE will be uplink time synchronized to the pico cell.

Figure 12:
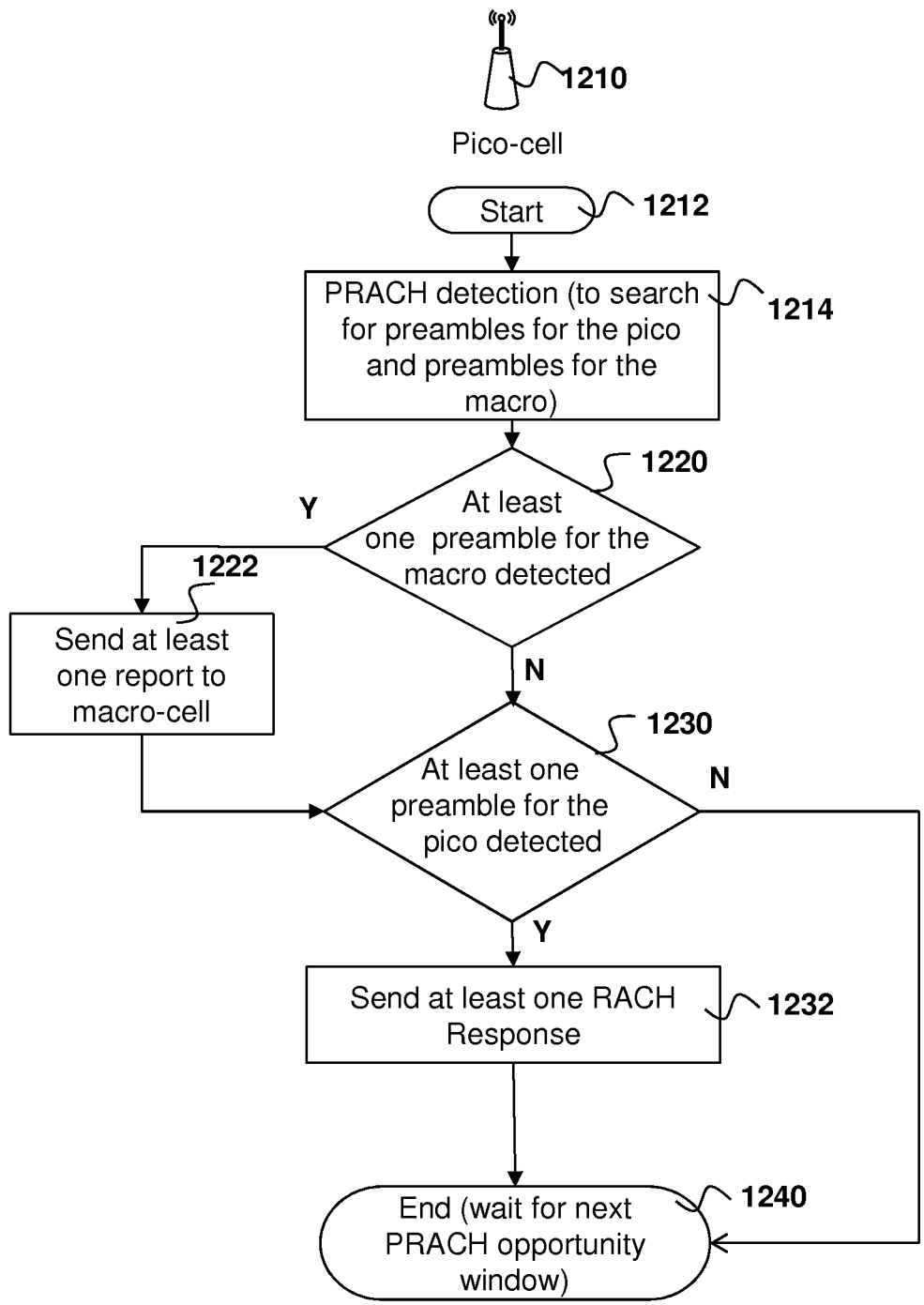
FIG. 12 is a process diagram showing a process at a pico eNB for detecting a PRACH preamble when one set of PRACH preambles is used and the macro and pico cells have non-overlapping opportunity windows according to one embodiment.

On the pico cell side 1210 in FIG. 12, the process starts at block 1212 and proceeds to block 1214 in which a PRACH detection occurs. In the case of a pico cell, the pico cell will look for the PRACH preambles for the pico, i.e., the preambles using a pico-cell preamble format and a pico-cell PRACH preamble sequence, and the PRACH preambles for the macro, i.e., the preambles using a pico-cell preamble format and a macro-cell PRACH preamble sequence.

The process then proceeds to block 1220 in which a check is made to see whether at least one PRACH preamble for the macro was detected. If yes, the process proceeds to block 1222 in which at least one report is sent to the macro cell. From block 1222 the process then proceeds to block 1230. Further, from block 1220 if no PRACH preamble for the macro was detected the process also proceeds to block 1230.

At block 1230, a check is made to see whether or not at least one PRACH preamble for the pico was detected. If yes, a RACH response for each of the at least one detected PRACH preamble is sent at block 1232 and the process then proceeds to block 1240 and ends. Further, if no pico cell PRACH preamble was found at block 1230 the process proceeds to block 1240 and ends.

The embodiments of FIGS. 11 and 12 therefore provide for the case where the non-overlapping PRACH opportunity windows exist and therefore each of the macro cell 1110 and pico cell 1210 will only detect the PRACH preambles that were sent in the opportunity window for that eNB or cell.

Figure 13:
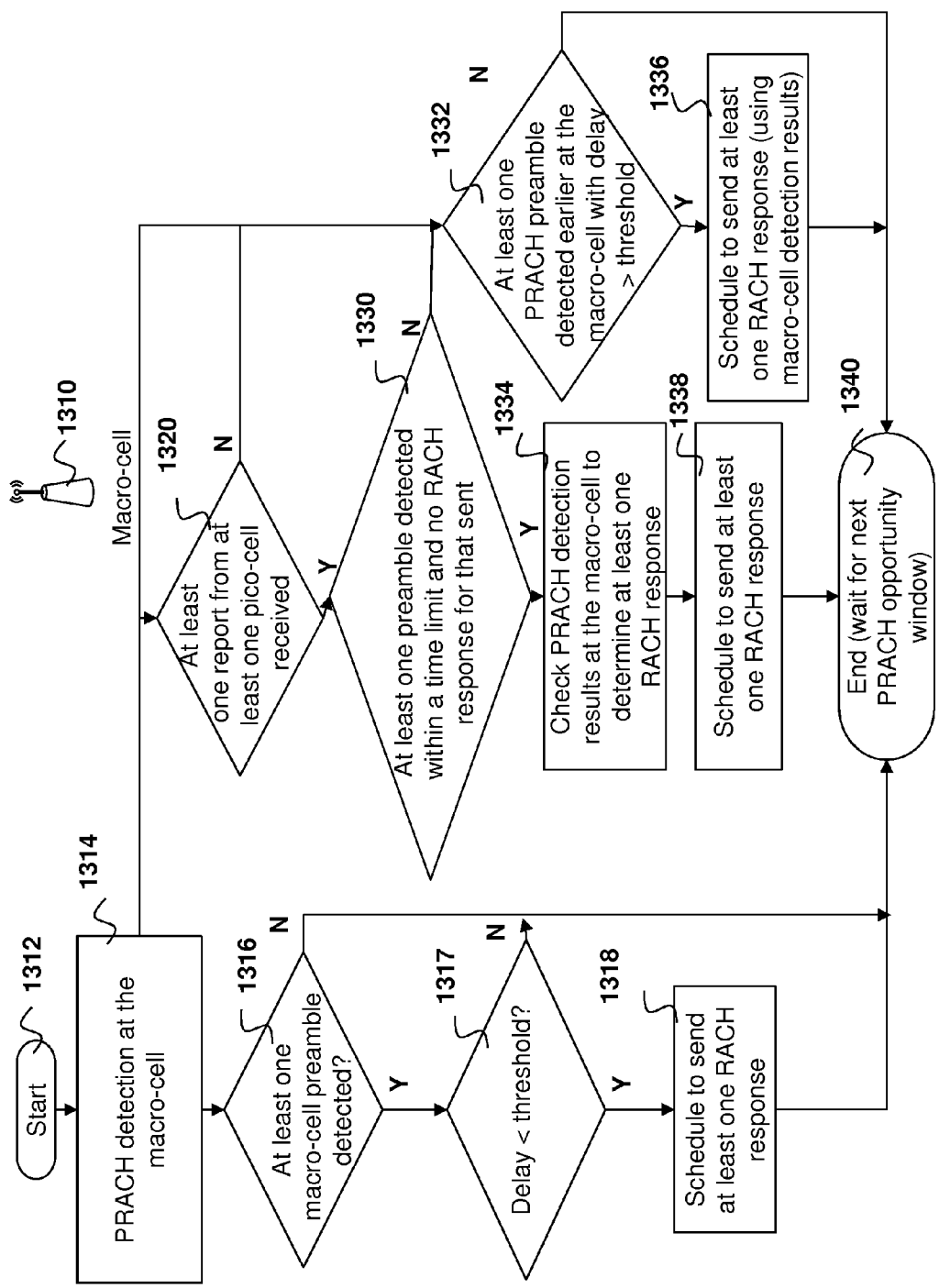
FIG. 13 is a process diagram showing a process at a macro eNB for detecting a PRACH preamble when one set of PRACH preambles is used and the macro and pico cells have overlapping opportunity windows according to one embodiment.

Conversely, if the macro cell and low power nodes have overlapping opportunity windows, reference is made to FIG. 13. In the embodiment of FIG. 13, the process for the macro cell 1310 starts at block 1312 and proceeds to block 1314 in which a PRACH detection is made to search for the macro cell preambles. Here, a macro-cell preamble means a preamble using a sequence from the set of macro cell PRACH preamble sequences and using one of a macro cell preamble format and a pico cell preamble format.

The process then proceeds in parallel from block 1314 to block 1316, block 1320 and block 1332. At block 1316 a check is made to determine whether or not at least one macro cell PRACH preamble was detected. If yes, the process proceeds to block 1317 in which a check is made to determine whether the associated round trip delay (RTD) is less than a threshold. The delay in this case is the sum of two one-way propagation delays. For a UE identifying itself in a close-to-neighbor situation and using the pico-cell downlink time as its PRACH transmission time reference, the associated round trip delay could be the delay from the pico to the UE and then from the UE to the macro. For a UE not identifying itself in a close-to-neighbor situation and using the macro-cell downlink time as its PRACH transmission time reference, the associated round trip delay could be the delay from the macro to the UE and then from the UE to the macro. If the delay is less than the threshold, that means that the UE is closer to the macro cell and is less likely in a close-to-neighbor situation whereas if the delay is greater than the threshold then it may mean that the UE may be in a close-to-neighbor situation.

From block 1317, if the detected delay is greater than the threshold then the process proceeds to block 1318 in which scheduling may be done for each of at least one detected PRACH preamble to send a RACH response (RAR1). If no, the process proceeds to block 1340 and ends.

The process at block 1320 determines if there is at least one PRACH report received from at least one pico-cell. If yes, the process proceeds to block 1330. Otherwise, the process proceeds to block 1332.

The process at block 1330 determines if at least one PRACH preamble in at least one PRACH detection report was detected within a time limit $T_o$, i.e., was detected within the time period from $t-T_o$ to t, and for which a corresponding RACH response has not been sent. It is possible that some of the PRACH preambles detected at pico cells were detected at the macro-cell and their corresponding RACH responses have been sent. Those PRACH preambles can be skipped as their RACH responses have been sent. If yes, the process proceeds to block 1334.

At block 1334, a check is first made to determine if a PRACH preamble identified from block 1330 was detected earlier in block 1314. If the identified PRACH preamble was not detected earlier in block 1314, the PRACH detection result from the at least one pico-cell is used in the RACH response for the detected preamble.

If the identified PRACH preamble was also detected earlier in block 1314, a comparison is made on the PRACH detection results between the macro cell and the at least one pico cell to determine which PRACH detection result will be used in the RACH response for the detected preamble. If the PRACH detection result from the at least one pico cell, including at least one of the associated delay and uplink power control adjustment is smaller than that from the macro cell, the PRACH detection result from the at least one pico is used. Otherwise, the PRACH detection result from the macro is used.

The process proceeds from block 1334 to block 1338 in which a RACH response for each of the at least one PRACH preamble is scheduled to be sent.

From block 1338 the process proceeds to block 1340 and ends

If, in blocks 1320 or 1330, the check is negative, the process also proceeds to block 1332.

The process at block 1332 determines if at least one macro cell PRACH preamble was detected within the time period from $t-T_o$ to $t-T_o+T_1$ at the detection at block 1314 and its delay is larger than a threshold, due to which its corresponding RACH response has not been sent. If yes, the process proceeds to block 1336 in which a RACH response is scheduled using the macro-cell detection result.

From block 1336, the process proceeds to block 1340 and ends.

Figure 14:
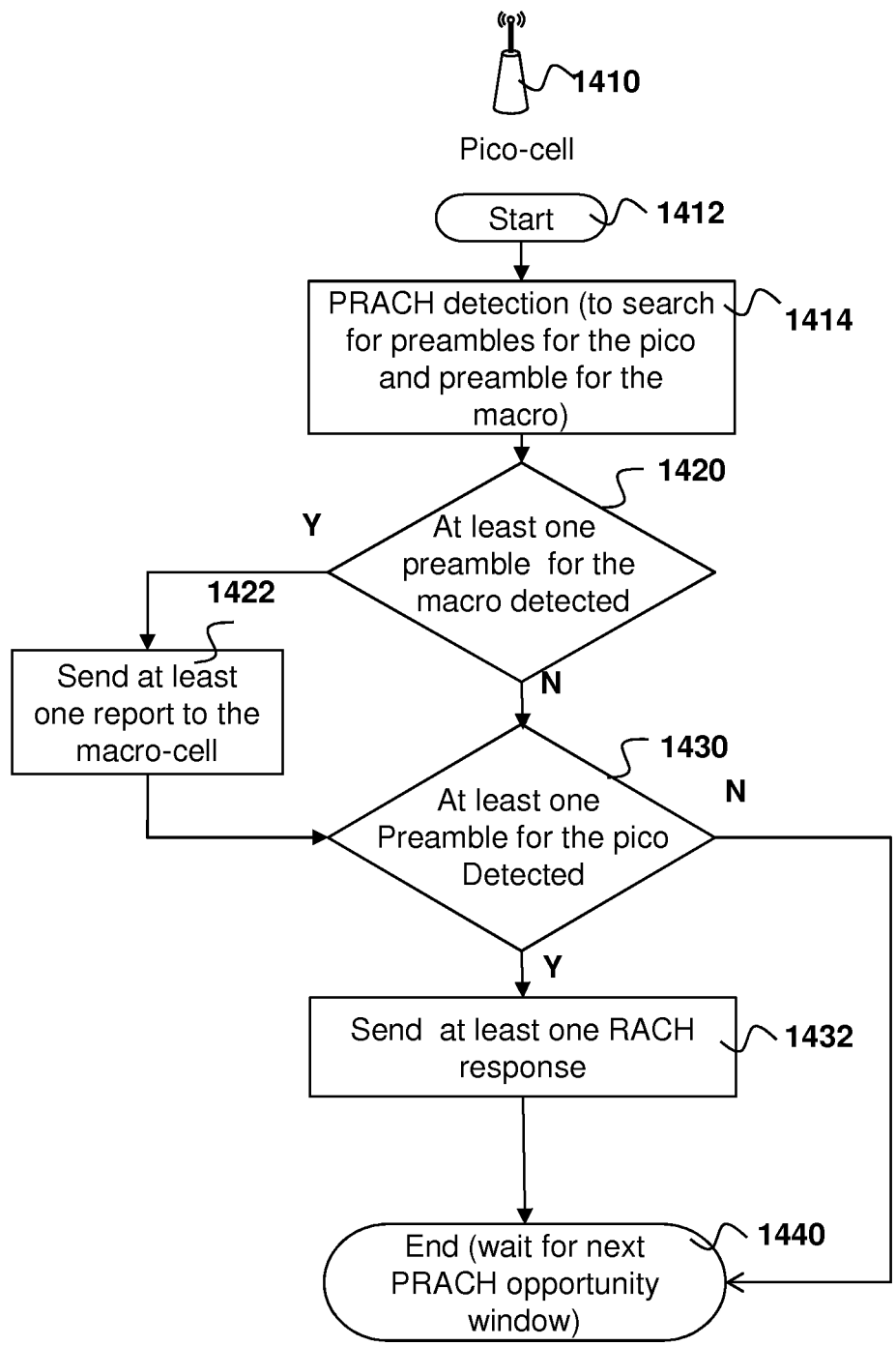
FIG. 14 is a process diagram showing a process at a pico eNB for detecting a PRACH preamble when one set of PRACH preambles is used and the macro and pico cells have overlapping opportunity windows according to one embodiment.

Referring to FIG. 14, on the pico cell 1410 side, the process starts at block 1412 and proceeds to block 1414 in which the PRACH detection occurs. The PRACH detection at block 1414 searches for the PRACH preambles for the pico cell and the preambles for the macro cell. At a pico, a preamble is said to be for the pico if it uses a pico-cell preamble format and a pico-cell PRACH preamble sequence, and a preamble is said to be for the macro if it uses a pico-cell preamble format and a macro-cell PRACH preamble sequence.

The process then proceeds to block 1420 in which a check is made to determine whether at least one PRACH preamble for the macro was detected. If yes, the process proceeds to block 1422 in which at least one report for the at least one detected PRACH preamble for the macro is sent to the macro cell.

The process then proceeds to block 1430 and checks whether or not at least one PRACH preamble for the pico was detected.

Also, from the check at block 1420, if no PRACH preamble for the macro was found the process proceeds directly to block 1430.

The check at block 1430 determines whether or not at least one PRACH preamble for the pico was detected and if yes, the process proceeds to block 1432 and sends a RACH response to the pico UE that sent the detected PRACH preamble for the pico.

If no pico PRACH was detected at block 1430 or after the sending of the RACH at block 1432, the process proceeds to block 1440 and ends. Thus, in accordance with the above, the pico cell monitors both the PRACH preambles for the pico and the PRACH preambles for the macro. If a PRACH preamble for the macro is detected, the pico cell notifies the macro cell.

Alternative Embodiments

In a first alternative embodiment to the above, instead of a second set of macro cell preamble sequences, an alternative is for each pico cell to define a special set of PRACH preamble sequences for the macro cell UE in a close-to-pico situation to use. Thus, the pico cell would define the PRACH preambles. In this case, the pico cell may need to broadcast the configuration for the special set of PRACH preamble sequences and the UE may need to receive the broadcasted configuration information from each pico cell.

In a second alternative, a special PRACH opportunity window may be configured. Thus, in an alternative to time frequency aligned PRACH opportunity windows between the macro and pico cells, a special PRACH opportunity window as shown in FIG. 15 can be defined from macro cell UE in a close-to-neighbor situation.

Figure 15:
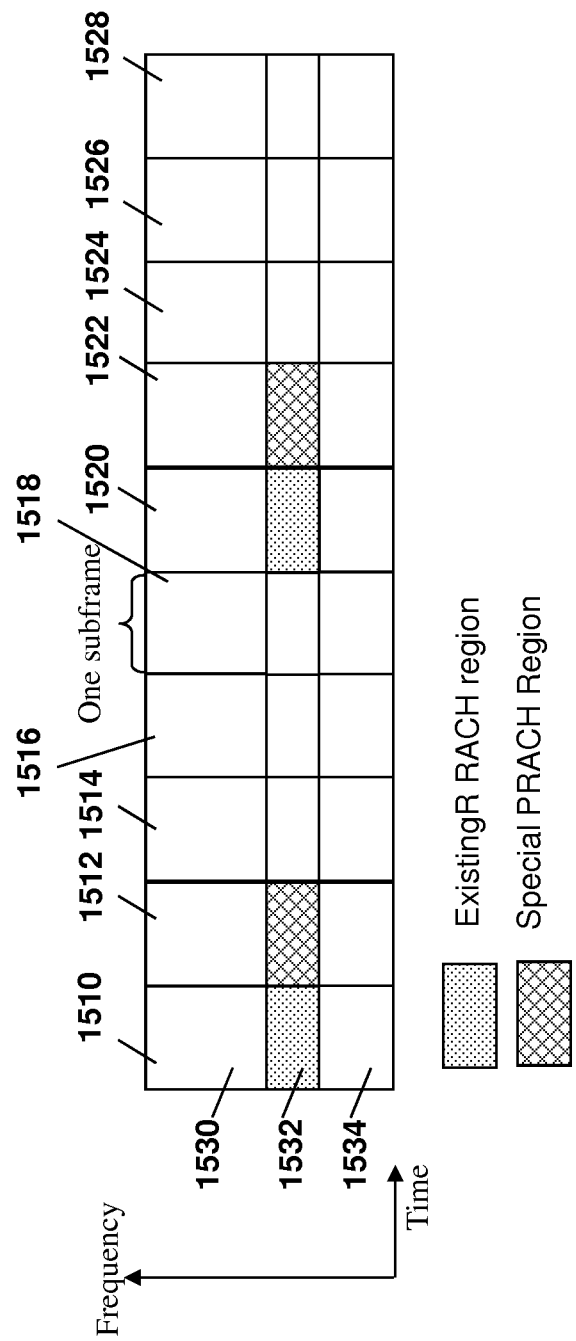
FIG. 15 is a block diagram showing an arrangement of PRACH subframes according to one embodiment.

Reference is now made to FIG. 15, which shows an arrangement transmission of sub-frames in accordance with one embodiment of the present disclosure. In the embodiment of FIG. 15, two PRACH time frequency resources are arranged with one PRACH resource configuration for macro cell UEs in a close-to-neighbor situation and another configuration for remaining UEs in the cell.

In particular, in FIG. 15, sub-frames 1510, 1512, 1514, 1516, 1518, 1520, 1522, 1524, 1526 and 1528 are shown.

Each sub-frame is frequency divided as shown, for example, by areas 1530, 1532 and 1534. Thus, for example, in sub-frame 1510, area 1532 could be allocated as a PRACH resource.

In accordance with one embodiment, the area 1532 of sub-frame 1510 is configured for all UEs.

Similarly, area 1532 of sub-frame 1512 is configured for UEs in a close-to-neighbor situation. Thus a UE can send a PRACH preamble in the new window when it is in a close-to-neighbor situation. In this case, the UE can use the cell with the strongest downlink signal as its target cell for the PRACH transmission and does not need to use any sequence from the second set of PRACH preambles sequences. Since high interference may be expected in this PRACH opportunity window, neighbor cells may avoid using the uplink resources overlapping with the special PRACH opportunity window.

In the above, the network may configure the special PRACH opportunity window from the macro cell and the configuration is broadcast over the air to the UEs by the macro cell. Coordination between the macro cell and pico cells is used so that the pico cells are aware of the time-frequency resource locations of the special PRACH window, pico cells may avoid using the time-frequency resources corresponding to the special PRACH window or may use the overlap time frequency resources as pico cell PRACH resources.

In a further embodiment, all cells may be time synchronized.

A special PRACH power offset for UEs in a close-to-neighbor situation may also be configured by the network.

Further, at the UE, the UE uses a cell with the strongest downlink signal as the target cell to calculate the PRACH transmit power. In one embodiment, if a UE does not identify itself in a close-to-neighbor situation, it can use all PRACH resource locations to transmit a PRACH preamble. In another embodiment, if the new PRACH window is overloaded, the macro eNB could configure such that the special PRACH window is not used for any UE not identifying itself as a UE in a close-to-neighbor situation. For a UE that identifies itself as a UE in a close-to-neighbor situation, the PRACH preamble is sent in the special PRACH window and the special power offset is used. If the UE camps on the macro cell and identifies itself in a close-to-neighbor situation the UE may still use the macro cell as the target cell to calculate its PRACH transmit power, except the UE will add the special PRACH power offset to transmit a PRACH preamble.

With regard to the macro eNB and the pico eNB, coordination may need to occur. If the network expects pico cells to detect PRACH preambles from the macro UEs in a close-to-pico situation and to forward the detected results to the macro cell, the network can set a negative PRACH power offset and rely on pico cells to detect the PRACH preambles and forward the detection results to the macro cell. In this case, UEs in the pico cells can use the PRACH resources overlapping with the special PRACH window.

In this case, there may be no increase on network PRACH resource locations as all resource locations, including the special PRACH window, can be used by all UEs, except that UEs in a close-to-neighbor situation are restricted to using the special PRACH window.

If the network does not expect pico cells to detect the PRACH preambles from macro UEs in a close-to-neighbor situation, the network can set the special PRACH power offset the same as other PRACH power offsets. In this case, both macro cells and pico cells can detect PRACH preambles sent in the special PRACH opportunity window. However, the pico cell PRACH resource locations overlapped with the special PRACH window may see strong PRACH interference from the macro cell and it may be better for the pico cells not to use those PRACH resources.

The above may be implemented by any network element. A simplified network element is shown with regard to FIG. 16.

Figure 16:
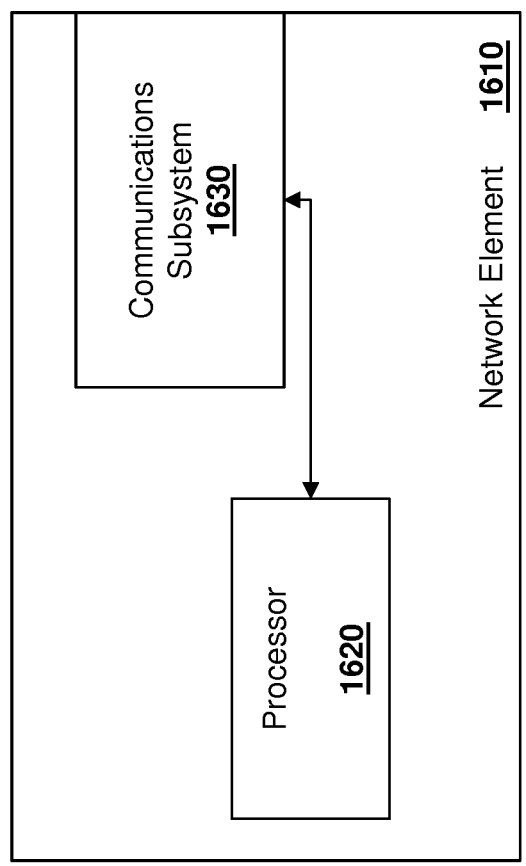
FIG. 16 is a block diagram of a simplified network element capable of being used with the methods and systems herein according to one embodiment.

In FIG. 16, network element 1610 includes a processor 1620 and a communications subsystem 1630, where the processor 1620 and communications subsystem 1630 cooperate to perform the methods described above.

Further, the above may be implemented by any UE. One exemplary device is described below with regard to FIG. 17.

UE 1700 is typically a two-way wireless communication device having voice and data communication capabilities. UE 1700 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1700 is enabled for two-way communication, it may incorporate a communication subsystem 1711, including a receiver 1712 and a transmitter 1714, as well as associated components such as one or more antenna elements 1716 and 1718, local oscillators (LOs) 1713, and a processing module such as a digital signal processor (DSP) 1720. As will be apparent to those skilled in the field of communications, the particular design of the communication subsystem 1711 will be dependent upon the communication network in which the device is intended to operate.

Network access requirements will also vary depending upon the type of network 1719. In some networks network access is associated with a subscriber or user of UE 1700. A UE may require a removable user identity module (RUIM) or a subscriber identity module (SIM) card in order to operate on a network. The SIM/RUIM interface 1744 is normally similar to a card-slot into which a SIM/RUIM card can be inserted and ejected. The SIM/RUIM card can have memory and hold many key configurations 1751, and other information 1753 such as identification, and subscriber related information.

Figure 17:
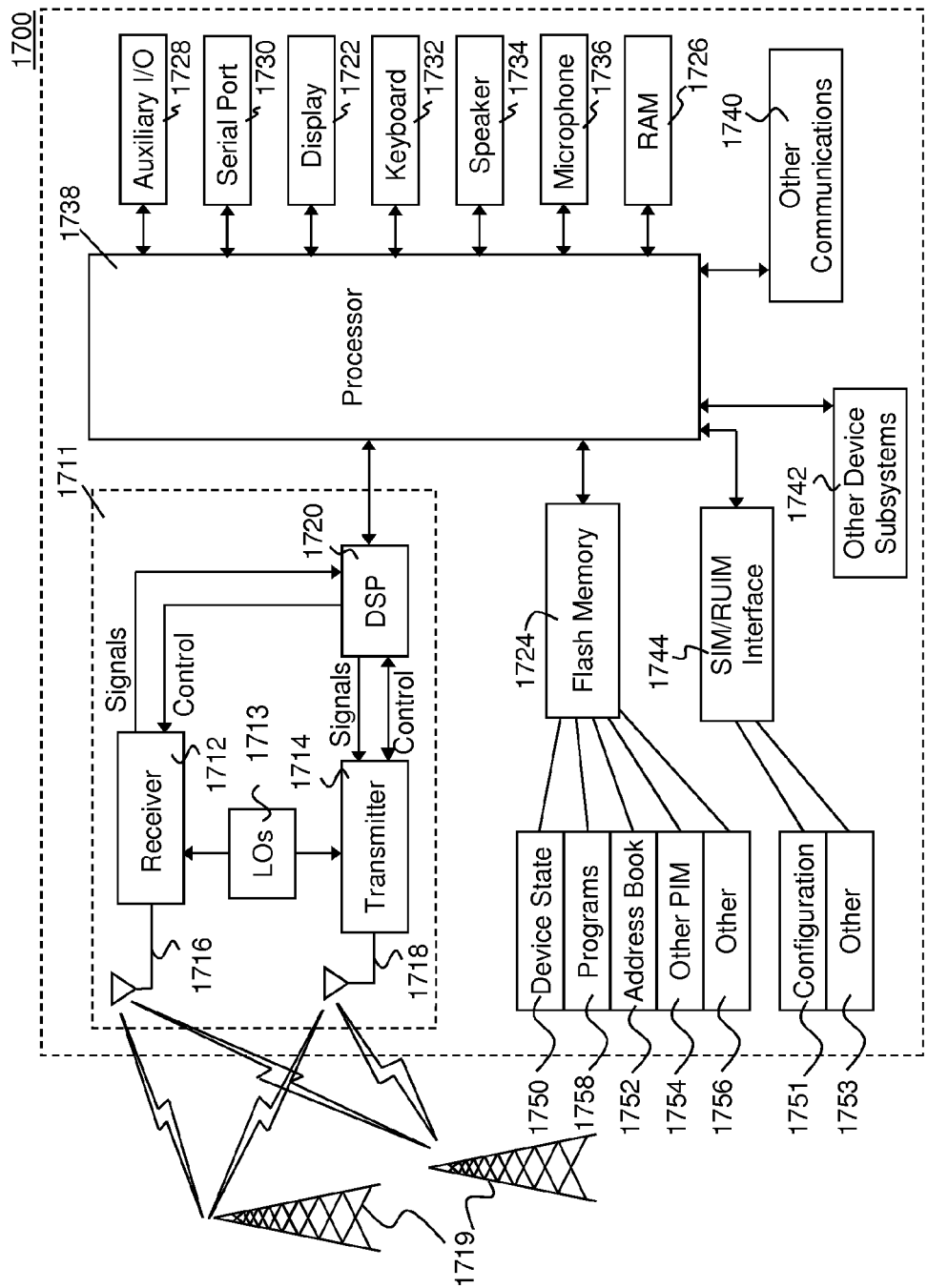
FIG. 17 is a block diagram of a user equipment according to one embodiment.

When required network registration or activation procedures have been completed, UE 1700 may send and receive communication signals over the network 1719. As illustrated in FIG. 17, network 1719 can include multiple base stations communicating with the UE.

Signals received by antenna 1716 through communication network 1719 are input to receiver 1712, which may perform such common receiver functions as signal amplification, frequency down conversion, filtering, channel selection and the like. Analog to digital (ND) conversion of a received signal allows more complex communication functions such as demodulation and decoding to be performed in the DSP 1720. In a similar manner, signals to be transmitted are processed, including modulation and encoding for example, by DSP 1720 and input to transmitter 1714 for digital to analog (D/A) conversion, frequency up conversion, filtering, amplification and transmission over the communication network 1719 via antenna 1718. DSP 1720 not only processes communication signals, but also provides for receiver and transmitter control. For example, the gains applied to communication signals in receiver 1712 and transmitter 1714 may be adaptively controlled through automatic gain control algorithms implemented in DSP 1720.

UE 1700 generally includes a processor 1738 which controls the overall operation of the device. Communication functions, including data and voice communications, are performed through communication subsystem 1711. Processor 1738 also interacts with further device subsystems such as the display 1722, flash memory 1724, random access memory (RAM) 1726, auxiliary input/output (I/O) subsystems 1728, serial port 1730, one or more keyboards or keypads 1732, speaker 1734, microphone 1736, other communication subsystem 1740 such as a short-range communications subsystem and any other device subsystems generally designated as 1742. Serial port 1730 could include a USB port or other port known to those in the art.

Some of the subsystems shown in FIG. 17 perform communication-related functions, whereas other subsystems may provide "resident" or on-device functions. Notably, some subsystems, such as keyboard 1732 and display 1722, for example, may be used for both communication-related functions, such as entering a text message for transmission over a communication network, and device-resident functions such as a calculator or task list.

Operating system software used by the processor 1738 may be stored in a persistent store such as flash memory 1724, which may instead be a read-only memory (ROM) or similar storage element (not shown). Those skilled in the art will appreciate that the operating system, specific device applications, or parts thereof, may be temporarily loaded into a volatile memory such as RAM 1726. Received communication signals may also be stored in RAM 1726.

As shown, flash memory 1724 can be segregated into different areas for both computer programs 1758 and program data storage 1750, 1752, 1754 and 1756. These different storage types indicate that each program can allocate a portion of flash memory 1724 for their own data storage requirements. Processor 1738, in addition to its operating system functions, may enable execution of software applications on the UE. A predetermined set of applications that control basic operations, including at least data and voice communication applications for example, will normally be installed on UE 1700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 1719. Further applications may also be loaded onto the UE 1700 through the network 1719, an auxiliary I/O subsystem 1728, serial port 1730, short-range communications subsystem 1740 or any other suitable subsystem 1742, and installed by a user in the RAM 1726 or a non-volatile store (not shown) for execution by the processor 1738. Such flexibility in application installation increases the functionality of the device and may provide enhanced on-device functions, communication-related functions, or both. For example, secure communication applications may enable electronic commerce functions and other such financial transactions to be performed using the UE 1700.

In a data communication mode, a received signal such as a text message or web page download will be processed by the communication subsystem 1711 and input to the processor 1738, which may further process the received signal for output to the display 1722, or alternatively to an auxiliary I/O device 1728.

A user of UE 1700 may also compose data items such as email messages for example, using the keyboard 1732, which may be a complete alphanumeric keyboard or telephone-type keypad, among others, in conjunction with the display 1722 and possibly an auxiliary I/O device 1728. Such composed items may then be transmitted over a communication network through the communication subsystem 1711.

For voice communications, overall operation of UE 1700 is similar, except that received signals may typically be output to a speaker 1734 and signals for transmission may be generated by a microphone 1736. Alternative voice or audio I/O subsystems, such as a voice message recording subsystem, may also be implemented on UE 1700. Although voice or audio signal output is preferably accomplished primarily through the speaker 1734, display 1722 may also be used to provide an indication of the identity of a calling party, the duration of a voice call, or other voice call related information for example.

Serial port 1730 in FIG. 17 may normally be implemented in a personal digital assistant (PDA)-type UE for which synchronization with a user's desktop computer (not shown) may be desirable, but is an optional device component. Such a port 1730 may enable a user to set preferences through an external device or software application and may extend the capabilities of UE 1700 by providing for information or software downloads to UE 1700 other than through a wireless communication network. The alternate download path may for example be used to load an encryption key onto the device through a direct and thus reliable and trusted connection to thereby enable secure device communication. As will be appreciated by those skilled in the art, serial port 1730 can further be used to connect the UE to a computer to act as a modem.

Other communications subsystems 1740, such as a short-range communications subsystem, is a further optional component which may provide for communication between UE 1700 and different systems or devices, which need not necessarily be similar devices. For example, the subsystem 1740 may include an infrared device and associated circuits and components or a Bluetooth™ communication module to provide for communication with similarly enabled systems and devices. Subsystem 1740 may further include non-cellular communications such as WiFi or WiMAX.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a user equipment operating in a heterogeneous wireless network having a plurality of access nodes comprising a first access node and at least one low power access node, Wherein the user equipment is configured to receive stronger downlink signals from the first access node than from the at least one low power access node, the method comprising:
   determining, by the user equipment, whether a low power access node is better for uplink data transmission than the first access node, the low power access node having lower transmit power than the first access node and being within the coverage area of the first access node;
   identifying, by the user equipment, one random access preamble out of a plurality of sets of random access preambles, wherein the plurality of sets includes a first set of random access preambles used for sending to the first access node, and a second set of random access preambles used for sending to the low power access node; and
   if the low power access node is better for uplink data transmission, sending from the user equipment to the low power access node, a random access preamble belonging to the first set of random access preambles for sending to the first access node.

2. The method of claim 1, wherein the determining comprises comparing a reference signal received power ('RSRP') from the low power access node with an RSRP from the first access node.

3. The method of claim 1, wherein the low power access node is determined to be better for uplink data transmission if the RSRP from the first access node minus the RSRP from the low power access node is less than a value, the value comprising at least one of
   a network configured RSRP difference threshold; and
   a difference between a network configured RSRP offset for the low power access node and the network configured RSRP offset for the first access node.

4. The method of claim 1, wherein the determining comprises detecting a first downlink path loss from the first access node to the user equipment and a second downlink path loss from the low power access node to the user equipment, and wherein the low power access node is determined to be better for uplink data transmission if the difference between the first downlink path loss and the second downlink path loss exceeds a path loss difference threshold.

5. The method of claim 1, wherein the first set of random access preambles includes at least partially same preambles as the second set of random access preambles.

6. The method of claim 1, wherein the first set of random access preambles includes preambles different from the second set of random access preambles.

7. The method of claim 1, wherein sending the random access preamble comprises sending a random access preamble of the second set of random access preambles,
   wherein sending the random access preamble of the second set of random access preambles further comprises adjusting an uplink transmit power for the random access preamble sent in the sending step, based on a downlink path loss to the low power access node to the user equipment and a network configurable random access power offset.

8. The method of claim 1, further comprising determining a random access time-frequency resource for the random access preamble transmission, based on a random access resource configuration from the low power access node; and determining the transmission time of the random access preamble according to the timing of the low power access node.

9. The method of claim 1, wherein sending the random access preamble comprises sending the random access preamble in physical random access channel ('PRACH') time-frequency resources allocated for the low power access node.

10. A user equipment operating in a heterogeneous wireless network having a plurality of access nodes comprising a first access node and at least one low power access node, wherein the user equipment receives stronger downlink signals from the first access node than from the at least one low power access node, the user equipment comprising:
    a processor; and
    a communications subsystem,
wherein the processor and communications subsystem cooperate to:
    determine whether a low power access node is better for uplink data transmission than the first access node, the low power access node having lower transmit power than the first access node and being within the coverage area of the first access node;
    identify one random access preamble out of a plurality of sets of random access preambles, wherein the plurality of sets includes a first set of random access preambles used for sending to the first access node, and a second set of random access preambles used for sending to the low power access node; and
    if the low power access node is better for uplink data transmission, send to the low power access node, a random access preamble belonging to the first set of random access preambles for sending to the first access node.

11. A method at a low power access node operating in a heterogeneous wireless network having a plurality of access nodes comprising a first access node and at least one low power access node, the method comprising:
    determining, at the low power access node, a presence of a first random access preamble, wherein the first random access preamble is of a first set of preambles at a first set of physical random access channel ('PRACH') opportunities rather than from a second set of preambles at a second set of PRACH opportunities, wherein the first set of preambles is configured for the first access node and the second set of preambles is configured for the low power access node, the low power access node having lower transmit power than the first access node and being within the coverage area of the first access node; and forwarding a report of the first random access preamble to the first access node.

12. The method of claim 11, wherein the report contains at least one of: a random access network temporary identifier; a detected second time of arrival; a detected preamble identifier; a detected second time offset; a detected second uplink power adjustment; or a detected received power.

13. The method of claim 11, wherein the first set of preambles is different from the second set of preambles.

14. The method of claim 11, wherein the first set of preamble opportunities is different from the second set of preamble opportunities.

15. The method of claim 11, wherein the first set of preamble opportunities is the same as the second set of preamble opportunities.

16. A low power access node operating in a heterogeneous wireless network having a plurality of access nodes comprising a first access node and at least one low power access node, the low power access node comprising:
   a processor; and
   a communications subsystem,
wherein the processor and communications subsystem cooperate to:
   determine, at the low power access node, a presence of a first random access preamble, wherein the first random access preamble is of a first set of preambles at a first set of physical random access channel ('PRACH') opportunities rather than from a second set of preambles at a second set of PRACH opportunities, wherein the first set of preambles is configured for the first access node and the second set of preambles is configured for the low power access node, the low power access node having lower transmit power than the first access node and being within the coverage area of the first access node; and
   forward a report of the first random access preamble to the first access node.

17. A method at a first access node operating in a heterogeneous wireless network having a plurality of access nodes comprising the first access node and at least one low power access node, the method comprising:
   signalling first set and a second set of random access preambles and a first set and a second set of random access opportunities, wherein a first preamble of the first set of random access preambles is from a user equipment receiving downlink signals from the first access node to send a random access preamble to the first access node over the first set of random access opportunities and a second preamble of the second set of random access preambles is intended for a user equipment receiving downlink signals from the first access node to send a random access preamble to a lower power node over the second set of random access opportunities; detecting a presence of a first preamble of the first set of random access preambles over the first set of random access opportunities;
   receiving at least a physical random access channel ('PRACH') detection report from at least one low power access node, the low power access node having lower transmit power than the first access node and being within the coverage area of the first access node, the report containing at least one of: a random access preamble identifier indicating a second preamble of the second set of random access preambles detected over the second preamble opportunities, a preamble resource identifier indicating the time-frequency resource over which the preamble was detected, a detected second time of arrival, a second time offset, or a second uplink power adjustment; and
   sending a random access response for each of at least one of the first preamble or the second preamble detected by the first access node or received in the report from the at least one low power access node.

18. The method of claim 17, wherein the detecting determines whether the first preamble is present in the first set of PRACH opportunities and measures a first time offset and a first uplink power adjustment from a desired timing and received power level.

19. The method of claim 17, wherein the first set of preambles and the second set of preambles are different.

20. The method of claim 17, wherein
   if at least one PRACH preamble included in the at least one report was detected within a time limit, sending a random access response based on the random access preamble identifier received in the report, setting time synchronization in the random access response to be for the at least one low power access node.

21. The method of claim 17, wherein the first set of preambles and the second set of preambles are the same.

22. The method of any claim 17, wherein the first set of random access opportunities is non-overlapping with the second set of random access opportunities.

23. The method of claim 17, wherein the first set of random access opportunities overlaps with the second set of random access opportunities.

24. The method of claim 18, wherein if the first preamble is detected at the first access node and the first time offset is less than a threshold, sending a random access response based on the random access preamble detected at the first access node.

25. The method of claim 17, wherein
   if at least one PRACH preamble included in the at least one report was detected within a time limit and the first preamble is not detected at the first access node, sending a random access response based on the random access preamble identifier received in the report and setting time synchronization in the random access response to be for the at least one low power access node.

26. The method of claim 18, wherein
   if the first preamble is detected at the first access node, at least one PRACH preamble included in the at least one report is the same as the first preamble, the at least one PRACH preamble included in the at least one report was detected within a time limit, and the random access response for the first preamble has not been sent, comparing at least one of the first time offset to the second time offset and the first uplink power adjustment to the second uplink power adjustment;
   if at least one of the first time offset is smaller than the second time offset and the first uplink power adjustment is greater than the second uplink power adjustment, sending a random access response based on the random access preamble detected at the first access node;
   otherwise, sending a random access response based on the random access preamble identifier received in the report and setting time synchronization in the random access response to be for the at least one low power access node.

27. The method of claim 18, wherein
   if the first preamble is detected at the first access node, at least one PRACH preamble included in the at least one report is the same as the first preamble, the at least one PRACH preamble included in the at least one report was detected within a time limit, the random access response for the first preamble has not been sent, and the first time offset is greater than a threshold, sending a random access response based on the random access preamble detected at the first access node.

28. A first access node operating in a heterogeneous wireless network having a plurality of access nodes comprising the first access node and at least one low power access node, the first access node comprising:
- a processor; and
- a communications subsystem, wherein the processor and communications subsystem cooperate to:
- signal a first set and a second set of random access preambles and a first set and a second set of random access opportunities, wherein a first preamble of the first set of random access preambles is from a user equipment receiving downlink signals from the first access node to send a random access preamble to the first access node over the first set of random access opportunities and a second preamble of the second set of random access preambles is intended for a user equipment receiving downlink signals from the first access node to send a random access preamble to a lower power node over the second set of random access opportunities;
- detect a presence of a first preamble of the first set of random access preambles over the first set of random access opportunities;
- receive at least a physical random access channel ('PRACH') detection report from at least one low power access node, the low power access node having lower transmit power than the first access node and being within the coverage area of the first access node, the report containing at least one of: a random access preamble identifier indicating a second preamble of the second set of random access preambles detected over the second preamble opportunities, a preamble resource identifier indicating the time-frequency resource over which the preamble was detected, a detected second time of arrival, a second time offset, or a second uplink power adjustment; and
- send a random access response for each of at least one of the first preamble or the second preamble detected by the first access node or received in the report from the at least one low power access node.

* * * * *